United States Patent
Jones et al.

(10) Patent No.: US 12,392,101 B2
(45) Date of Patent: Aug. 19, 2025

(54) GROUT HAVING A RESIN-BASED SYSTEM FOR ANCHORING, AND METHODS RELATING THERETO

(71) Applicant: Halliburton Energy Services, Inc., Houston, TX (US)

(72) Inventors: Paul J. Jones, Houston, TX (US); Siva Rama Krishna Jandhyala, Houston, TX (US); Walmy Cuello Jimenez, Houston, TX (US); Richard F. Vargo, Jr., Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 210 days.

(21) Appl. No.: 18/200,752

(22) Filed: May 23, 2023

(65) Prior Publication Data
US 2024/0392524 A1 Nov. 28, 2024

(51) Int. Cl.
*E02D 5/38* (2006.01)
*C01B 21/064* (2006.01)

(52) U.S. Cl.
CPC .............. *E02D 5/38* (2013.01); *C01B 21/064* (2013.01); *C01P 2004/13* (2013.01); *C01P 2004/50* (2013.01); *E02D 2200/1685* (2013.01); *E02D 2250/0023* (2013.01); *E02D 2300/0006* (2013.01); *E02D 2300/002* (2013.01); *E02D 2300/0026* (2013.01)

(58) Field of Classification Search
CPC .............. E02D 5/38; E02D 2200/1685; E02D 2250/0023; E02D 2300/0006; E02D 2300/002; E02D 2300/0026; C01B 21/064; C01P 2004/13; C01P 2004/50
See application file for complete search history.

(56) References Cited

U.S. PATENT DOCUMENTS

| | | | |
|---|---|---|---|
| 4,181,454 A | 1/1980 | Knox et al. | |
| 4,238,536 A | 12/1980 | Koch et al. | |
| 4,310,265 A | 1/1982 | Streich | |
| 4,311,414 A | 1/1982 | Baldridge | |

(Continued)

FOREIGN PATENT DOCUMENTS

| | | |
|---|---|---|
| CN | 1887781 A | 1/2007 |
| CN | 102180628 A | 9/2011 |

(Continued)

OTHER PUBLICATIONS

Luo et al.; "Shape Stabilized Phase Change Materials with Superior Thermal Conductivity for Thermal Energy Harvesting"; 2022; ACS Applied Polymer Materials (Year: 2022).*

(Continued)

*Primary Examiner* — Kyle Armstrong
(74) *Attorney, Agent, or Firm* — Conley Rose, P.C.; Rodney B. Carroll

(57) ABSTRACT

A pile can include: an elongated member; and a grout at least partially coupled to and for anchoring the elongated member, comprising: a resin; and a boron nitride nanotube structure comprising a boron nitride nanotube having a hexagonal boron nitride structure epitaxial to the boron nitride nanotube, wherein the grout has a first volume substantially free of the boron nitride nanotube structure, and a second volume comprising the boron nitride nanotube structure.

20 Claims, 10 Drawing Sheets

(56) References Cited

U.S. PATENT DOCUMENTS

| | | |
|---|---|---|
| 8,561,707 B2 | 10/2013 | Jin et al. |
| 8,590,627 B2 | 11/2013 | Jin et al. |
| 8,602,113 B2 | 12/2013 | Jin et al. |
| 10,228,485 B2 | 3/2019 | Jin et al. |
| 10,344,440 B2 | 7/2019 | Surjaatmadja |
| 11,091,964 B1 | 8/2021 | Whitfill et al. |
| 11,332,369 B2 | 5/2022 | Taylor et al. |
| 2014/0299377 A1 | 10/2014 | Abbassian et al. |
| 2016/0046854 A1 | 2/2016 | Gordon et al. |
| 2017/0058181 A1* | 3/2017 | Frantz .................... F24T 10/10 |
| 2019/0292051 A1 | 9/2019 | Taylor et al. |
| 2021/0324704 A1 | 10/2021 | Jandhyala |
| 2021/0363401 A1 | 11/2021 | Jones et al. |

FOREIGN PATENT DOCUMENTS

| | | |
|---|---|---|
| CN | 105780772 A | 7/2016 |
| CN | 105956241 A | 9/2016 |
| CN | 110218052 A | 9/2019 |
| CN | 110642570 A | 1/2020 |
| CN | 108914911 B | 2/2021 |
| CN | 114117592 A | 3/2022 |
| JP | 2012031699 A | 2/2012 |
| KR | 101161844 B1 | 7/2012 |
| KR | 101541781 B1 * | 8/2015 |
| KR | 101652508 B1 | 10/2016 |
| KR | 101735261 B1 | 5/2017 |
| KR | 101802250 B1 | 11/2017 |
| KR | 102196008 B1 | 12/2020 |
| WO | 2006041051 A1 | 4/2006 |
| WO | 2008123326 A1 | 10/2008 |

OTHER PUBLICATIONS

Kim et al.; "Boron nitride nanotubes: synthesis and applications"; 2018; Nano Convergence (Year: 2018).*

Filing Receipt, Specification and Drawings for U.S. Appl. No. 63/391,236, filed Jul. 21, 2022, entitled "Method of Grout Selection for Long Term Integrity of Anchoring Piles," 64 pages.

Filing Receipt, Specification and Drawings for U.S. Appl. No. 17/956,033, filed Sep. 29, 2022, entitled "Method of Grout Selection for Long Term Integrity of Anchoring Piles," 65 pages.

Filing Receipt, Specification and Drawings for U.S. Appl. No. 18/131,124, filed Apr. 5, 2023, entitled "Liquid Suspension Composition for Wellbore Operations, and Methods of Making and Using Same," 79 pages.

Filing Receipt, Specification and Drawings for U.S. Appl. No. 17/866,311, filed Jul. 15, 2022, entitled "Biologically Derived Cement Retarder," 34 pages.

Filing Receipt, Specification and Drawings for U.S. Appl. No. 17/977,700, filed Oct. 31, 2022, entitled "Resin-Based Materials for Use in Wellbore Operations," 60 pages.

Foreign Communication from Related Application—International Search Report and Written Opinion of the International Searching Authority, International Application No. PCT/US2023/022219, dated Sep. 18, 2023, 12 pages.

Foreign Communication from Related Application—International Search Report and Written Opinion of the International Searching Authority, International Application No. PCT/US2024/022501, dated Jul. 24, 2024, 12 pages.

* cited by examiner

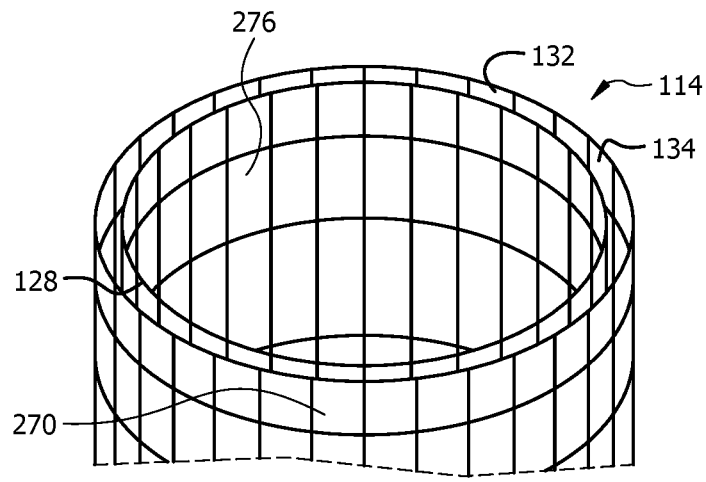
FIG. 9A
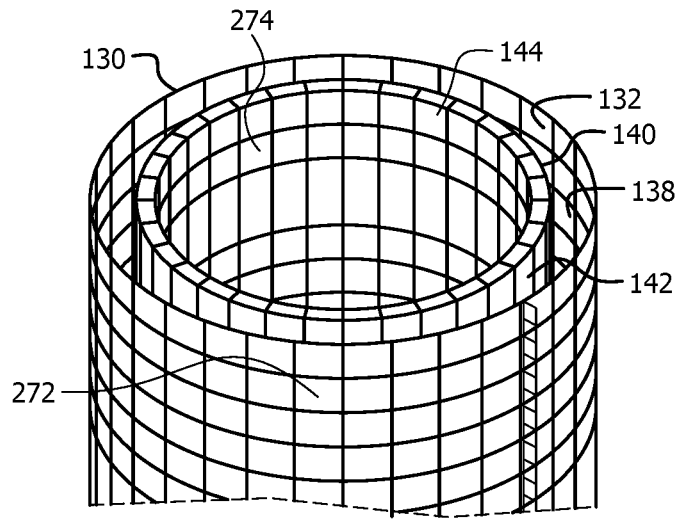
FIG. 9B
160
| Property | Value | Unit |
|---|---|---|
| Young's Modulus | 0.281 | MPsi |
| Poisson's Ratio | 0.33 | Assumed |
| Compressive Strength | 10347 | PSI |
| Tensile Strength | 2619 | PSI |
FIG. 10

GROUT HAVING A RESIN-BASED SYSTEM FOR ANCHORING, AND METHODS RELATING THERETO

CROSS-REFERENCE TO RELATED APPLICATIONS

None.

BACKGROUND

Anchoring piles are frequently installed in onshore and offshore environments to provide support for superstructures exerting large loads, for example, to provide suitable foundations or anchors for windfarms in both land and offshore locations. An onshore location can intersect or transit a sensitive area such as an aquafer or water table. Offshore structures, e.g., offshore oil and gas platforms, can utilize a specialized construction process including specialized vessels during the construction process.

In recent years there has been growing activity in the development of renewable energy devices, for example, windfarms. Such devices can be subjected to large dynamic loads during operation and typically require a pile system to be anchored to a subterranean formation to provide foundational support. The loading on the windfarm foundation can include compression loading, tension loading, and transverse loading that results in a bending moment.

Thus, an ongoing need exists for improved systems, methods, and compositions related to installing pile systems for use as foundational supports for a variety of purposes such as anchoring offshore windfarm platforms to the seabed.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIGS. 9A-9B are illustrations of embodiments of grout interfaces.

FIG. 10 is a table of an embodiment of grout mechanical properties.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As used herein, the term "and/or" can mean one or more of items in any combination in a list, such as "A and/or B" means "A, B, or the combination of A and B".

As used herein, the term "coupled" can mean two items, directly or indirectly, joined, fastened, associated, connected, or formed integrally together either by chemical or mechanical means, by processes including stamping, molding, or welding. What is more, two items can be coupled by the use of a third component such as a mechanical fastener, e.g., a screw, a nail, a staple, or a rivet; an adhesive; or a solder.

The terms "uphole" and "downhole" may be used to refer to the location of various components relative to the bottom or end of a borehole or a fracture caused by driving or hammering a pile. For example, a first component described as uphole from a second component may be further away from the end of the borehole than the second component. Similarly, a first component described as being downhole from a second component may be located closer to the end of the borehole than the second component.

As used herein, the term "grout" can mean a material for filling a joint or seam and can include any suitable substance such as a resin that may include boron-nitride-based and/or hydrocarbon-based material, or a cementitious material.

As used herein, the term "pile" can mean a form of any suitable shape, such as a column, that extends into the earth and can serve as all or a portion of a foundation to support and/or secure a structure. A pile can have any suitable dimension, such as a diameter, suited to support the structure. In some embodiments, a pile can be a micropile.

A pile, piling, or pile system refers to one or more cylindrical columns of material (e.g., metal, such as steel, and/or concrete) extending into the earth and serving as all or a portion of a foundation to support and/or secure a structure. The pile systems may be installed onshore or offshore, e.g. on the seabed or ocean floor.

Figure 4:
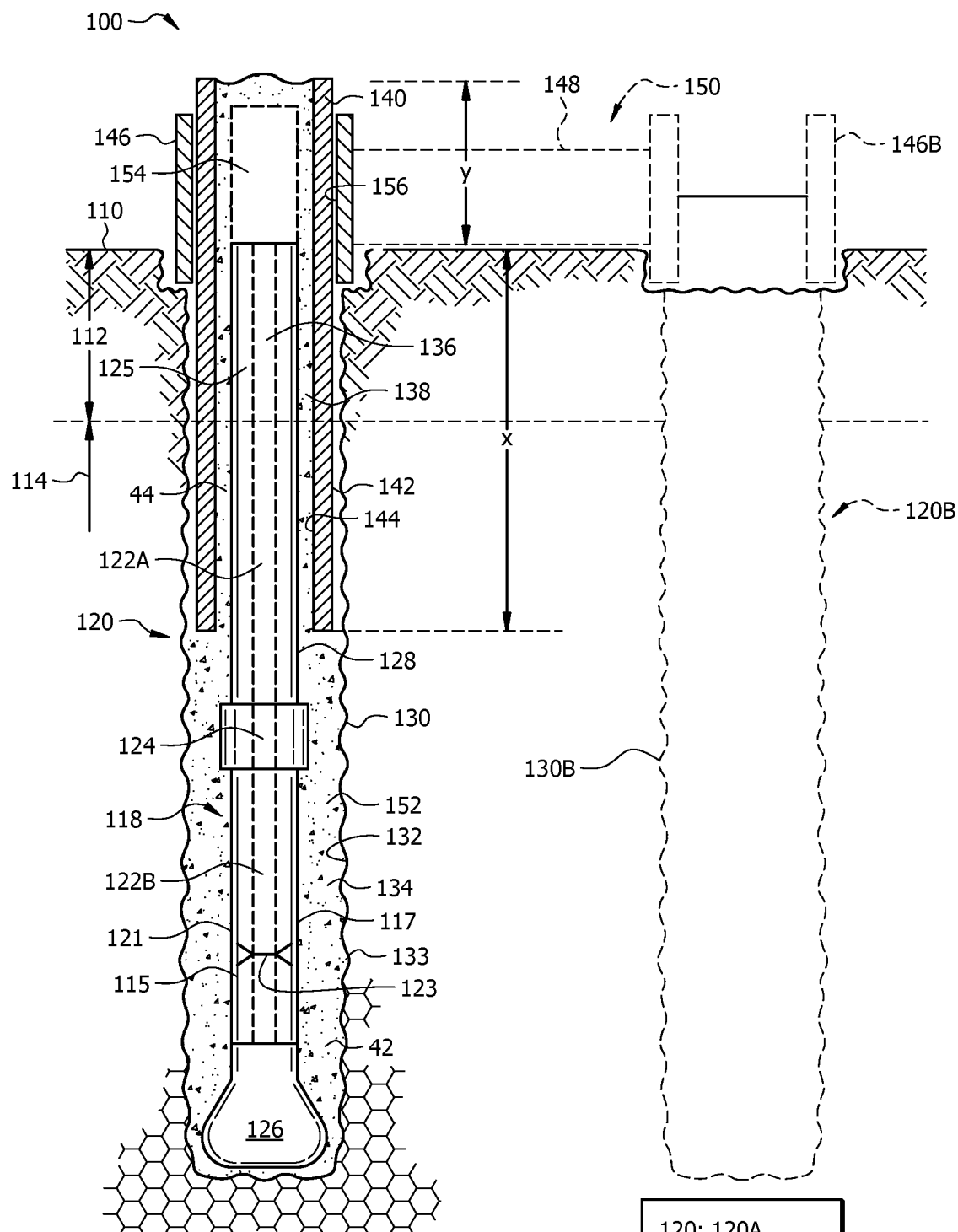
FIG. 4 is a cut-away illustration of an embodiment of a base anchor.

The pile system may include a pile, a sleeve, and a grout designed to withstand dynamic loading. The design of the pile system can depend on the stresses from the dynamic loading and the type of subterranean formation. The type of sleeve can depend on the depth of the formation, e.g., the location of hard rock. The sleeve can overlap an upper portion of the pile. One exemplary embodiment of a sleeve and a micropile is depicted in FIG. 4, discussed hereinafter. The selection of the grout can depend on the pile, the type of sleeve, the formation, and stresses applied to the pile system. Some grouts are more expensive than other grouts. As an example, a grout able to withstand most stresses may be more expensive than other grouts. A grout that is durable and can withstand such stresses while being utilized economically is desirable. Hence, there can be a benefit of selecting a mixture of grouts with varying stress tolerance that are introduced to regions according to their stress tolerance to economically construct the foundation supporting the superstructure.

After the piles have been installed, in some instances anchor structures can be placed on top of the piles. These structures are typically made of steel or concrete and are designed to provide a base anchor for a superstructure or a floating platform. Once the anchor structures are in place, the floating platform can be installed. This typically involves attaching the platform to the anchor structures using cables or chains. That being done, equipment such as wind turbines can be mounted on the platform. This may involve the use of cranes or other specialized equipment to lift the turbines into position.

In some embodiments, each pile is of a small diameter and is referred to herein as a micropile. The micropile may include an elongated member including concrete, a metal, such as a steel, or a combination thereof. Typically, the elongated member can be a substantially cylindrical piping typically hollow or a substantially cylindrical shaft typically solid, although the shaft may form an internal cavity. In some embodiments, grout is supplied in, around, or a combination thereof for forming a micropile. For example, micropiles of the type disclosed herein may have a diameter of no more than about 15 inches, about 1 to about 15 inches, about 3 to about 10 inches, or about 4 to about 5 inches.

When installing micropiles in the seabed floor in some embodiments for use in supporting offshore wind turbines, the installation process typically involves pre-drilling a hole (e.g., a borehole) in the seabed floor from a vessel, such as a barge, inserting the micropile into the hole, and then grouting the micropile to provide additional stability.

The process of inserting the micropile into the pre-drilled hole in the seabed floor typically involves the use of specialized equipment such as a hydraulic jack. The micropile is lowered into the pre-drilled hole, and the hydraulic jack is used to push the micropile into the seabed floor. The hydraulic jack can apply a controlled amount of force to the micropile, which is used to maintain the alignment of the micropile as it is inserted into the hole. The jack can be operated either manually or by using a remote control system.

Once the micropile is positioned, often additional stability is provided to ensure support of the offshore wind turbine. In some embodiments, the micropile is grouted. Grouting is the process of filling the space between the micropile and the surrounding soil with a material (e.g., the grout), typically either based on a resin or a cementitious material. The grout can serve to bond the micropile to the surrounding soil and provides additional support and stability to the foundation.

In some embodiments, the process of grouting the micropile typically involves the use of a high-pressure grout pump, which is used to inject the grout into the space between the micropile and the surrounding soil (e.g., the annular space between the micropile and a wall of the borehole drilled into the subterranean formation). The grout is pumped into the space under high pressure, which may completely fill the annular space between the micropile and the surrounding soil. The grout can be left to cure, which typically takes several hours. Afterwards, the foundation may be considered fully stabilized and ready for use.

Figure 1:
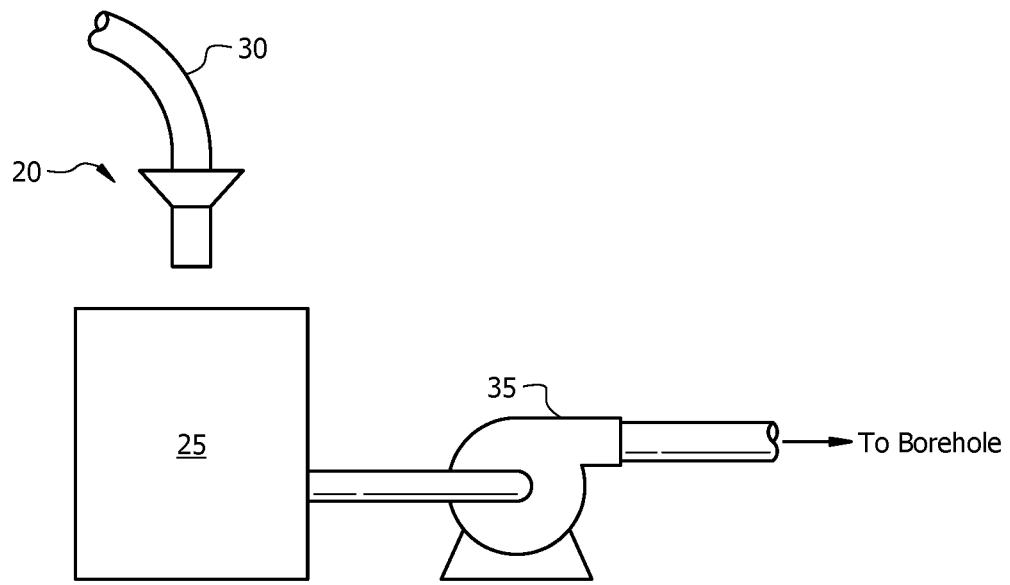
FIG. 1 is a perspective illustration of an embodiment of pumping and mixing equipment for sealing with a grout.

Referring now to FIG. 1, the preparation of a grout will now be described. FIG. 1 is an illustration of a system 20 for the preparation of a grout and delivery to a borehole in accordance with certain examples. As shown, the resin and boron nitride nanotube structure, which may be referred to herein as "BNNS", may be combined and mixed in a vessel 25. An ultrasonic probe sonicator 30 may be introduced to the vessel 25 and used to disperse the BNNS within the resin to form the grout. Additional additives may be added into the vessel 25 and combined with the grout as desired. In some examples, the vessel 25 may comprise the mixing equipment itself, for example, a jet mixer, a re-circulating mixer, or a batch mixer. Should vessel 25 comprise mixing equipment, the ultrasonic probe sonicator 30 may be used before or after mixing the components of the grout with the mixing equipment. In some examples, the ultrasonic probe sonicator may be used to disperse the BNNS into the resin in a separate vessel and then the grout may be added to the vessel 25 to be further mixed with the mixing equipment of the vessel 25 if present.

After the grout has been prepared it may be pumped via a pumping equipment 35 to the borehole. In some examples, the vessel 25 and the pumping equipment 35 may be disposed on one or more mixing/pumping trucks as will be apparent to those of ordinary skill in the art. In some examples, a jet mixer may be used to continuously mix the grout as it is being pumped to the borehole.

In some embodiments, one or more micropiles can provide an anchoring structure for large loads, both in offshore and land applications (i.e. windfarms). A plurality of micropiles can be constructed by installing a template onto the ground, drilling a borehole into a formation, placing a tension structure, e.g., micropile, that straddles a portion of the sleeve and the borehole, filling the borehole with a grout material, and connecting the operational loads to a load point coupled to the template. Each step of the construction process can have an effect on the other steps of the construction process. For example, the grout material between subterranean formation and the one or more micropiles can provide the necessary support and bonding between the pile and its adjacent bodies, e.g., the formation or the steel template. In another scenario, the grout material within an interface located between the sleeve and tension structure can provide necessary support and bonding to transfer the stress from the grout to a sleeve interface, and then to the tension structure. A structured design and installation process for combining the complexity of the operational loads, the variety of subterranean formations, and the various grout materials is desirable.

In some embodiments, a blend of grout material can be introduced to withstand the various operational loads occurring at different locations of the structure. The method can use a subterranean grout or a combination of subterranean and surface grouts that influence each other.

In some embodiments, the grout can include a resin and BNNS. Although this grout in some embodiments can provide superior strength, this material may be more costly than other grouts, such as grouts having resin absent the BNNS, or based on a cementitious material.

In some embodiments, the grout can include the resin and BNNS for sealing operations. In certain embodiments, the BNNS is dispersed within a resin. This inclusion of the BNNS typically improves the characteristics of the resin for borehole sealing.

The inclusion of the BNNS within the resin may improve the material characteristics of the resin. For example, the addition of the BNNS to the resin may result in improvements to tensile strength, stress at yield, and Young's modulus. The grout may possess improved performance in sealing operations such as primary cementing and remedial cementing. For example, the grouts may possess superior temperature resistance than traditional resins. The grout may perform better in aggressive environments than traditional resins. Another advantage of these grouts is that the BNNS can be easier to disperse within the resin than boron nanotubes or other species of nanotubes. The BNNS structure may limit contact between the individual nanotubes in the BNNS, thereby reducing the influence of Van der Walls forces while also increasing the area of interaction within the resin matrix in order to improve dispersion and the bulk mechanical properties.

In some embodiments, the grout comprises the BNNS. Boron nitride nanotubes are nano-scale hollow tubes. The BNNS is a structure that comprises a boron nitride nanotube and at least one hexagonal boron nitride structure. The hexagonal boron nitride structure(s) is/are epitaxial with respect to the boron nitride nanotube. Accordingly, each BNNS includes a boron nitride nanotube and at least one hexagonal boron nitride structure epitaxial to the boron nitride nanotube.

The boron nitride nanotubes may have diameters in the range of from about 3 to about 30 nanometers, and lengths in the range of about 10 nanometers to about 50 microns. The boron nitride nanotubes may have a structure consisting of a single tubular layer (e.g., single-wall boron nitride nanotubes), as well as a structure consisting of multiple tubular layers which are each generally coaxial (e.g., multi-wall boron nitride nanotubes). The boron nitride nanotubes may comprise one or more layers (i.e., walls), with each layer consisting of a generally tubular arrangement of boron atoms and nitrogen atoms. The boron atoms and nitrogen atoms may be arranged in a repeating hexagonal pattern in which boron atoms and nitrogen atoms alternate.

Epitaxy is the process of nucleating a crystal of a well-defined particular orientation with respect to the seed crystal. For each hexagonal boron nitride structure, the atoms in the hexagonal boron nitride structure, and the atoms in the boron nitride nanotube structure that are closest to the hexagonal boron nitride structure, are arranged in the manner that results from nucleating a hexagonal boron nitride on the boron nitride nanotube structure and growing the hexagonal boron nitride structure on the nucleated hexagonal boron nitride. Epitaxial can refer to this hexagonal boron nitride structure grown from the arranged hexagonal boron nitride deposited on the boron nitride nanotube.

The hexagonal boron nitride structure can include a stacking of two-dimensional honeycomb lattices made of boron and nitrogen atoms that are strongly bound by highly polar B—N bonds. The layers of the hexagonal boron nitride may generally stack in an AA' stacking mode, i.e., a boron atom bearing a partial positive charge in one layer resides on the oppositely charged nitrogen atoms on the adjacent layers. Nodules of hexagonal boron nitride that are epitaxial with and covering the boron nitride nanotube structure are about 1 nm to about 200 nm thick.

Figure 2:
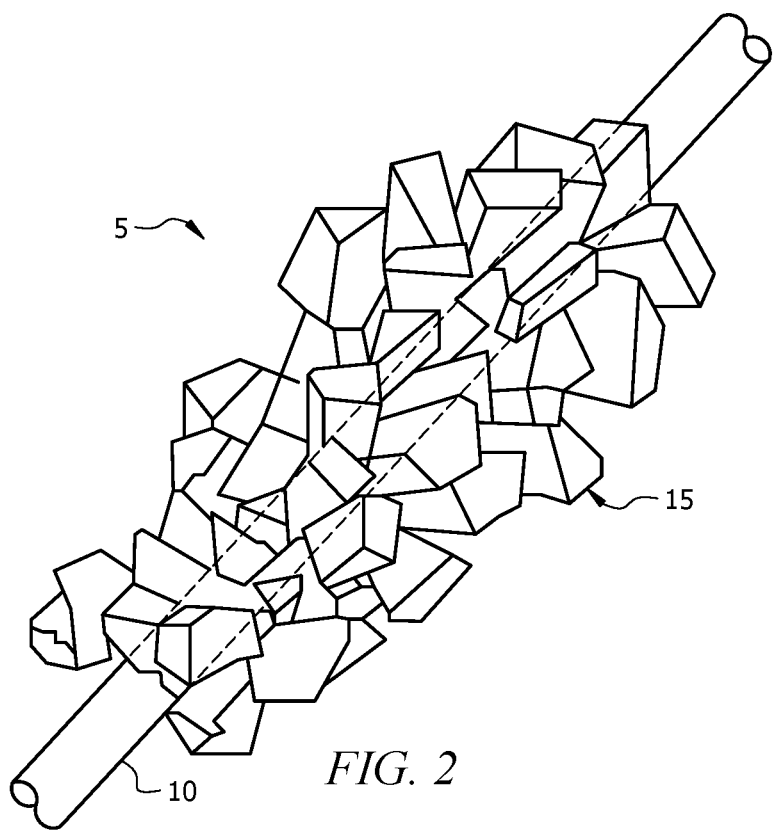
FIG. 2 is a perspective illustration of an embodiment of a hexagonal boron nitride structure having hexagonal boron nitride structures epitaxial to the boron nitride nanotube.

FIG. 2 is an embodiment of a BNNS 5. As depicted, the boron nitride nanotube 10 can serve as the seed structure from which a hexagonal boron nitride may be nucleated. The hexagonal boron nitride structure 15 may then be grown from the nucleated hexagonal boron nitride. The BNNS may be produced with a plasma generator such as an inductively coupled plasma generator or a DC arc plasma generator.

The concentration of the BNNS in the grout may range from about 0.1% to about 10%, by weight, based on the total weight of the grout. The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the BNNS in the grout may range, from about 0.1% to about 10%, by weight, based on the total weight of the grout, from about 0.5% to about 10%, by weight, based on the total weight of the grout, from about 1% to about 10%, by weight, based on the total weight of the grout, from about 3% to about 10%, by weight, based on the total weight of the grout, from about 5% to about 10%, by weight, based on the total weight of the grout, or from about 8% to about 10%, by weight, based on the total weight of the grout. As another example, the concentration of the BNNS in the grout may range from about 0.1% to about 10%, by weight, based on the total weight of the grout, from about 0.1% to about 8%, by weight, based on the total weight of the grout, from about 0.1% to about 5%, by weight, based on the total weight of the grout, from about 0.1% to about 3%, by weight, based on the total weight of the grout, from about 0.1% to about 1%, by weight, based on the total weight of the grout, or from about 0.1% to about 0.5%, by weight, based on the total weight of the grout. With the benefit of this disclosure, one of ordinary skill in the art will be readily able to prepare a grout having a sufficient concentration of the BNNS for a given application.

The BNNS is combined with a resin to form the grout. Examples of the resin include, but are not limited to, a shellac, a polyamide, a silyl-modified polyamide, a polyester, a polycarbonate, a polycarbamate, a urethane, a polyurethane, a natural resin, an olefin resin, an epoxy-based resin (e.g., epoxy-amine or epoxy-anhydride), a furan-based resin, a phenolic-based resin, a urea-aldehyde resin, a phenol-phenol formaldehyde-furfuryl alcohol resin, a bisphenol A diglycidyl ether resin, a butoxymethyl butyl glycidyl ether resin, a bisphenol A-epichlorohydrin resin, a bisphenol F resin, a bisphenol S resin, a diglycidyl ether of bisphenol F epoxy resin, an acrylic acid polymer, an acrylic acid ester polymer, an acrylic acid homopolymer, an acrylic acid ester homopolymer, a poly(methyl acrylate), a poly(butyl acrylate), a poly(2-ethylhexyl acrylate), an acrylic acid ester copolymer, a methacrylic acid derivative polymer, a methacrylic acid homopolymer, a methacrylic acid ester homopolymer, a poly(methyl methacrylate), a poly(butyl methacrylate), a poly(2-ethylhexyl methacrylate), an acrylamidomethylpropane sulfonate polymer or a copolymer, an acrylic acid/acrylamidomethylpropane sulfonate copolymer, a trimer acid, a fatty acid, a fatty acid derivative, maleic anhydride, acrylic acid, a polyester, a polycarbonate, a polycarbamate, an aldehyde, formaldehyde, a dialdehyde, glutaraldehyde, a hemiacetal, an aldehyde-releasing compound, a diacid halide, a dihalide, a dichloride, a dibromide, a polyacid anhydride, citric acid, an epoxide, furfuraldehyde, an aldehyde condensate, a silyl-modified polyamide, a condensation reaction product of a polyacid and a polyamine, any derivative thereof, or any combination thereof. With the benefit of this disclosure, one of ordinary skill in the art will be readily able to select a suitable resin for use with the grout.

In some embodiments that may be utilized at lower temperature, the resin can include a cyclic olefin that may be catalyzed with any suitable material to form a cyclic olefin-based resin. Such cyclic olefins may include cyclobutene, cyclopentene, cycloheptene, cyclooctene, cyclooctadiene, cyclooctatetraene, dicyclopentadiene, norbornene, or a combination thereof. In some embodiments, the cyclic olefin may be catalyze with a transition metal, such as scandium (Sc), titanium (Ti), vanadium (V), chromium (Cr), manganese (Mn), iron (Fe), cobalt (Co), nickel (Ni), copper (Cu), zinc (Zn), ruthenium (Ru), osmium (Os), or a combination thereof. In some embodiments, the catalyst may be a transition metal compound catalyst including a substituted or unsubstituted metal carbene compound comprising a transition metal and an organic backbone. Some non-limiting examples of the transition metal compound catalyst may include, but not are limited to, a catalyst sold under the trade designation Grubbs Catalyst® by Umicore Ag & Co KG of Hanua-Wolfgang, Germany and a Schrock catalyst. The Grubbs Catalyst® may include ruthenium alkylidene or osmium alkylidene and the Schrock catalyst may include molybdenum.

The concentration of the resin in the grout may range from about 0.5% (w/v) to about 99% (w/v). The concentration of the resin in the grout may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the resin in the grout may range from about 0.5% (w/v) to about 99% (w/v), from about 1% (w/v) to about 99% (w/v), from about 5% (w/v) to about 99% (w/v), from about 10% (w/v) to about 99% (w/v), from about 15% (w/v) to about 99% (w/v), from about 20% (w/v) to about 99% (w/v), from about 25% (w/v) to about 99% (w/v), from about 30% (w/v) to about 99% (w/v), from about 35% (w/v) to about 99% (w/v), from about 40% (w/v) to about 99% (w/v), from about 45% (w/v) to about 99% (w/v), from about 50% (w/v) to about 99% (w/v), from about 55% (w/v) to about 99% (w/v), from about 60% (w/v) to about 99% (w/v), from about 65% (w/v) to about 99% (w/v), from about 70% (w/v) to about 99% (w/v), from about 75% (w/v) to about 99% (w/v), from about 80% (w/v) to about 99% (w/v), from about 85% (w/v) to about 99% (w/v), from about 90% (w/v) to about 99% (w/v), or from about 95% (w/v) to about 99% (w/v). As another example, the concentration of the resin in the grout may range from about 0.5% (w/v) to about 99% (w/v), from about 0.5% (w/v) to about 95% (w/v), from about 0.5% (w/v) to about 90% (w/v), from about 0.5% (w/v) to about 85% (w/v), from about 0.5% (w/v) to about 80% (w/v), from about 0.5% (w/v) to about 75% (w/v), from about 0.5% (w/v) to about 70% (w/v), from about 0.5% (w/v) to about 65% (w/v), from about 0.5% (w/v) to about 60% (w/v), from about 0.5% (w/v) to about 55% (w/v), from about 0.5% (w/v) to about 50% (w/v), from about 0.5% (w/v) to about 45% (w/v), from about 0.5% (w/v) to about 40% (w/v), from about 0.5% (w/v) to about 35% (w/v), from about 0.5% (w/v) to about 30% (w/v), from about 0.5% (w/v) to about 25% (w/v), from about 0.5% (w/v) to about 20% (w/v), from about 0.5% (w/v) to about 15% (w/v), from about 0.5% (w/v) to about 10% (w/v), from about 0.5% (w/v) to about 5% (w/v), or from about 0.5% (w/v) to about 1% (w/v). With the benefit of this disclosure, one of ordinary skill in the art will be able to prepare a grout having a sufficient concentration of resin for a given application.

Optionally, in some examples, a hardening agent may be added to the grout. The hardening agent may be any hardening agent sufficient for curing the selected resin. Examples of the hardening agent include, but are not limited to, diethylenetoluene diamine, a cyclo-aliphatic amine, piperazine, a derivative of piperazine (e.g., aminoethylpiperazine), a modified piperazine, an aromatic amine, methylene dianiline, a hydrogenated form of dianiline, 4,4'-diaminodiphenyl sulfone, 2H-pyrrole, pyrrole, imidazole, pyrazole, pyridine, pyrazine, pyrimidine, pyridazine, indolizine, isoindole, 3H-indole, indole, 1H-indazole, purine, 4H-quinolizine, quinoline, isoquinoline, phthalazine, naphthyridine, quinoxaline, quinazoline, 4H-carbazole, carbazole, β-carboline, phenanthridine, acridine, phenathroline, phenazine, imidazolidine, phenoxazine, cinnoline, pyrrolidine, pyrroline, imidazoline, piperidine, indoline, isoindoline, quinuclindine, morpholine, azocine, azepine, 2H-azepine, 1,3,5-triazine, thiazole, pteridine, dihydroquinoline, hexamethylene imine, indazole, an amine, an aromatic amine, a polyamine, an aliphatic amine, ethylene diamine, diethylene triamine, triethylene tetraamine, tetraethylene pentaamine, a cyclo-aliphatic amine, an amide, a polyamide, 2-ethyl-4-methyl imidazole, 1,1,3-trichlorotrifluoroacetone, any derivative thereof, a transition metal carbene complex, or a combination thereof. With the benefit of this disclosure, one of ordinary skill in the art will be readily able to select a suitable hardening agent for use with the grout.

The concentration of the hardening agent in the grout may range from about 10% to about 150% based on the total weight of the resin. The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the hardening agent in the grout may range, from about 10% to about 150% based on the total weight of the resin, from about 20% to about 150% based on the total weight of the resin, from about 30% to about 150% based on the total weight of the resin, from about 40% to about 150% based on the total weight of the resin, from about 50% to about 150% based on the total weight of the resin, from about 60% to about 150% based on the total weight of the resin, from about 70% to about 150% based on the total weight of the resin, from about 80% to about 150% based on the total weight of the resin, from about 90% to about 150% based on the total weight of the resin, from about 100% to about 150% based on the total weight of the resin, from about 110% to about 150% based on the total weight of the resin, from about 120% to about 150% based on the total weight of the resin, from about 130% to about 150% based on the total weight of the resin, or from about 140% to about 150% based on the total weight of the resin. As another example, the concentration of the hardening agent in the grout may range from about 10% to about 150% based on the total weight of the resin, from about 10% to about 140% based on the total weight of the resin, from about 10% to about 130% based on the total weight of the resin, from about 10% to about 120% based on the total weight of the resin, from about 10% to about 110% based on the total weight of the resin, from about 10% to about 100% based on the total weight of the resin, from about 10% to about 90% based on the total weight of the resin, from about 10% to about 80% based on the total weight of the resin, from about 10% to about 70% based on the total weight of the resin, from about 10% to about 60% based on the total weight of the resin, from about 10% to about 50% based on the total weight of the resin, from about 10% to about 40% based on the total weight of the resin, from about 10% to about 30% based on the total weight of the resin, or from about 10% to about 20% based on the total weight of the resin,. With the benefit of this disclosure, one of ordinary skill in the art will be readily able to prepare a grout having a sufficient concentration of hardening agent for a given application.

Optionally, in some examples, the grout may include an accelerator to control the setting time of the grout. Examples of the accelerator include, but are not limited to, 2,4,6-tris (dimethylaminomethyl) phenol, benzyl dimethylamine, 1,4-diazabicyclo [2.2.2]octane), 2-ethyl,-4-methylimidazole, 2-methylimidazole, 1-(2-cyanoethyl) 2-ethyl-4-methylimidazole), aluminum chloride, boron trifluoride, a boron trifluoride ether complex, a boron trifluoride alcohol complex, a boron trifluoride amine complex, any derivative thereof, or any combination thereof. With the benefit of this disclosure, one of ordinary skill in the art will be readily able to select a suitable accelerator for use with the grout.

The concentration of the accelerator in the grout may range from about 0.1% to about 10%, by weight, based on the total weight of the grout. The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the accelerator in the grout may range, from about 0.1% to about 10%, by weight, based on the total weight of the grout, from about 0.5% to about 10%, by weight, based on the total weight of the grout, from about 1% to about 10%, by weight, based on the total weight of the grout, from about 3% to about 10%, by weight, based on the total weight of the grout, from about 5% to about 10%, by weight, based on the total weight of the grout, or from about 8% to about 10%, by weight, based on the total weight of the grout. As another example, the concentration of the accelerator in the grout may range from about 0.1% to about 10%, by weight, based on the total weight of the grout, from about 0.1% to about 8%, by weight, based on the total weight of the grout, from about 0.1% to about 5%, by weight, based on the total weight of the grout, from about 0.1% to about 3%, by weight, based on the total weight of the grout, from about 0.1% to about 1%, by weight, based on the total weight of the grout, or from about 0.1% to about 0.5%, by weight, based on the total weight of the grout. With the benefit of this disclosure, one of ordinary skill in the art will be readily able to prepare a grout having a sufficient concentration of accelerator for a given application.

Optionally, in some examples, a solvent may be added to the grout to adjust the viscosity of the grout. Any solvent that is compatible with the grout is suitable for use in the grout. Examples of solvents include, but are not limited to, a mineral oil, butyl lactate, butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, D-limonene, a fatty acid methyl ester, methanol, isopropanol, butanol, a glycol ether solvent, diethylene glycol methyl ether, dipropylene glycol methyl ether, 2-butoxy ethanol, an ether of a $C_2$ to $C_6$ dihydric alkanol containing at least one $C_1$ to $C_6$ alkyl group, a mono ether of a dihydric alkanol, methoxypropanol, butoxyethanol, hexoxyethanol, an isomer or a derivative thereof, or any combination thereof. With the benefit of this disclosure, one of ordinary skill in the art will be readily able to select a suitable solvent for use with the grout.

The concentration of the solvent in the grout may range from about 0.5% (w/v) to about 85% (w/v). The concentration of the solvent in the grout may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the solvent in the grout may range from about 0.5% (w/v) to about 85% (w/v), from about 1% (w/v) to about 85% (w/v), from about 5% (w/v) to about 85% (w/v), from about 10% (w/v) to about 85% (w/v), from about 15% (w/v) to about 85% (w/v), from about 20% (w/v) to about 85% (w/v), from about 25% (w/v) to about 85% (w/v), from about 30% (w/v) to about 85% (w/v), from about 35% (w/v) to about 85% (w/v), from about 40% (w/v) to about 85% (w/v), from about 45% (w/v) to about 85% (w/v), from about 50% (w/v) to about 85% (w/v), from about 55% (w/v) to about 85% (w/v), from about 60% (w/v) to about 85% (w/v), from about 65% (w/v) to about 85% (w/v), from about 70% (w/v) to about 85% (w/v), from about 75% (w/v) to about 85% (w/v), or from about 80% (w/v) to about 85% (w/v). As another example, the concentration of the solvent in the grout may range from about 0.5% (w/v) to about 85% (w/v), from about 0.5% (w/v) to about 80% (w/v), from about 0.5% (w/v) to about 75% (w/v), from about 0.5% (w/v) to about 70% (w/v), from about 0.5% (w/v) to about 65% (w/v), from about 0.5% (w/v) to about 60% (w/v), from about 0.5% (w/v) to about 55% (w/v), from about 0.5% (w/v) to about 50% (w/v), from about 0.5% (w/v) to about 45% (w/v), from about 0.5% (w/v) to about 40% (w/v), from about 0.5% (w/v) to about 35% (w/v), from about 0.5% (w/v) to about 30% (w/v), from about 0.5% (w/v) to about 25% (w/v), from about 0.5% (w/v) to about 20% (w/v), from about 0.5% (w/v) to about 15% (w/v), from about 0.5% (w/v) to about 10% (w/v), from about 0.5% (w/v) to about 5% (w/v), or from about 0.5% (w/v) to about 1% (w/v). With the benefit of this disclosure, one of ordinary skill in the art will be able to prepare a grout having a sufficient concentration of solvent for a given application.

The components of the grout may be combined in any order desired to form a grout that can be placed into a subterranean formation. In addition, the components of the grout may be combined using any mixing device compatible with the composition. The BNNS may be dispersed by indirect or direct sonification. In some examples, direct sonification using an ultrasonic probe sonicator, such as a sonic horn, may be used to disperse the BNNS within the resin of the grout. Any suitable frequency may be used to disperse the BNNS. In some embodiments, the frequency may be about 1 kilohertz (kHz) to about 100 kHz, or from about 10 kHz to about 40 KHz. In some embodiments, a 500 watt (W) sonic horn can be operated at 20 KHz to disperse BNNS in an epoxy resin, although higher wattage may be used for greater volumes. If a sonicator is used, sonication may continue until no particulate settling is observed. Generally, the resultant material is free of water, e.g., no more than about 1 weight percent (wt. %), about 0.1 wt. %, or about 0.01 wt. % water based on the total weight of the grout. With the benefit of this disclosure, other suitable techniques may be used for the preparation of the grout as will be appreciated by those of ordinary skill in the art in accordance with the disclosed examples.

The grout generally has a density suitable for a particular application. By way of example, the grout may have a density in the range of from about 4 pounds per gallon ("lb/gal") to about 20 lb/gal. In certain examples, the grout may have a density in the range of from about 8 lb/gal to about 17 lb/gal. Examples of the grout may comprise additives to reduce their densities, such as hollow microspheres, low-density elastic beads, or other density-reducing additives known in the art. In some examples, the density may be reduced after storing the grout, but prior to use. Those of ordinary skill in the art, with the benefit of this disclosure, will recognize the appropriate density of the grout for a particular application.

In some embodiments, a micropile, can include a concrete, a steel, or a combination thereof and a grout for anchoring the micropile. The grout can include a resin; and a boron nitride nanotube structure including a boron nitride nanotube having a hexagonal boron nitride structure epitaxial to the boron nitride nanotube. The grout can have a first volume substantially free of the BNNS and a second volume including the BNNS. The grout can be as described above.

Figure 3:
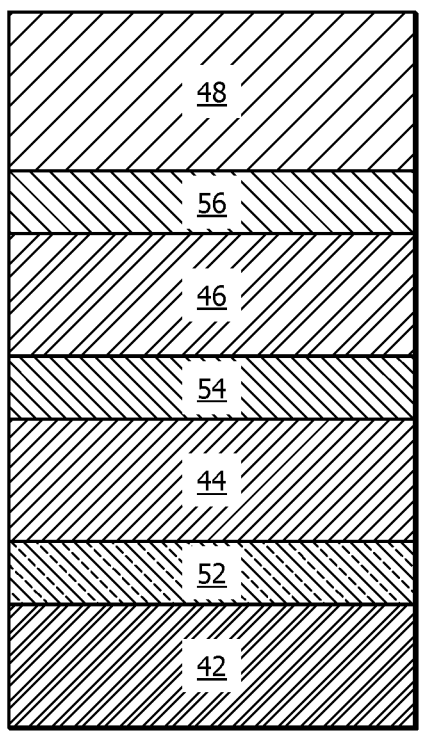
FIG. 3 is a perspective illustration of an embodiment of a plurality volumes introduced in a borehole or a passageway of a micropile.

In some embodiments referring to FIG. 3, a plurality of volumes 40 of grout, same or different, may be introduced into a borehole. In some embodiments, the volumes, including a first volume 42, a second volume 44, a third volume 46, and a fourth volume 48, may be introduced, although any suitable number of volumes may introduced. In some embodiments, the first volume 42 can be furthest downhole in a borehole or a passageway of a driven micropile, and the fourth volume 48 can be furthest uphole in the borehole or a passageway of a driven micropile. Optionally, a first spacer 52 can be introduced between the first volume 42 and second volume 44, a second spacer 54 can be introduced between the second volume 44 and the third volume 46, and a third spacer 56 can be introduced between the third volume 46 and the fourth volume 48, although any suitable number of volumes and spacers may be introduced.

In some embodiments, the plurality of volumes 40 can vary in concentration of BNNS, depending on the amount stress received by a micropile, as further discussed below. A micropile for a wind turbine can receive varying amounts of, e.g., axial, tensional, and compressional, stresses. Regions of the micropile receiving more stress can be grouted with a volume having a greater concentration of BNNS, while regions receiving less stress can be grouted with a volume having little or no BNNS. In some embodiments, the first and third volumes can be substantially free of BNNS, while the second and fourth volumes can have a greater concentration of BNNS corresponding to, respectively, regions near the surface and adjacent to a template adjacent abutting a micropile at the surface and an overlap of a micropile and a sleeve. In some embodiments, the second and fourth volumes can be substantially free of BNNS, while the first and third volumes can have a greater concentration of BNNS depending how the volumes are introduced. A volume may be considered substantially free of BNNS if it has no more than about 0.1%, by weight, of BNNS, based on the total weight of the volume, no more than about 0.05%, by weight, of BNNS, based on the total weight of the volume, no more than about 0.01%, by weight, of BNNS, based on the total weight of the volume, or no more than about 0.001%, by weight, of BNNS, based on the total weight of the volume.

In some embodiments, alternating volumes of grout including a cementitious material and a resin and the BNNS can be introduced. The cementitious material can include a Portland cement, a pozzolana cement, a gypsum cement, a shale cement, an acid cement, a base cement, a phosphate cement, a high alumina content cement, a slag cement, a silica cement, a high alkalinity cement, a magnesia cement, lime, or a combination thereof. In some embodiments, the volumes can be separated by a spacer. The spacer may be a hydrocarbon-based material, such as an oil. Optionally, the spacer may include a viscosifier to increase the viscosity of the spacer. In some embodiments, the first and third volumes can include a cementitious material and the second and fourth volumes can include BNNS, with the spacer between the first and second volumes, the second and third volumes, and the third and fourth volumes. Dedicated pumps can supply, respectively, a first grout having a cementitious material and a second grout having the resin and BNNS.

The exemplary grout disclosed herein may directly or indirectly affect one or more components or pieces of equipment associated with the preparation, delivery, recapture, recycling, reuse, and/or disposal of the disclosed grout. For example, the disclosed grout may directly or indirectly affect one or more mixers, related mixing equipment, mud pits, storage facilities or units, composition separators, heat exchangers, sensors, gauges, pumps, compressors, and the like used to generate, store, monitor, regulate, and/or recondition the exemplary compositions. The disclosed grout may also directly or indirectly affect any transport or delivery equipment used to convey the grout to a well site or downhole such as, for example, any transport vessels, conduits, pipelines, trucks, tubulars, and/or pipes used to compositionally move the grout from one location to another, any pumps, compressors, or motors (e.g., topside or downhole) used to drive the grout into motion, any valves or related joints used to regulate the pressure or flow rate of the grout, and any sensors (i.e., pressure and temperature), gauges, and/or combinations thereof, and the like.

Turning now to FIG. 4, illustrated is a base anchor 100 for one or more micropiles that can be utilized as a foundation to support a superstructure that exerts large loads into the foundation. In some embodiments, a borehole 130 can be drilled into the subterranean formation 114 using any suitable drilling technique and can extend in a substantially vertical direction away from the earth's surface 110. The surface 110 can be at ground level elevation when the borehole 130 is located on land. The surface 110 can be a seabed located underwater when the borehole is located offshore. The borehole 130 can be drilled through a first formation 112 into a subterranean formation 114. The first formation 112 can extend a portion of the measured depth of the borehole 130 and can be formed of a first layer of unconsolidated sediment. The subterranean formation 114 can be a hard rock formation with geologic properties different from the first formation 112.

In some embodiments, the micropile 120 comprises a sleeve 140, a tension structure 118, and at least one volume of a grout 134, a surface grout 138, or a combination thereof. The sleeve 140 can be a generally tubular member with an outer surface 142 and an inner surface 144. A portion of the sleeve 140 can extend a distance "X" into the borehole 130 measured from the surface 110. A portion of the sleeve 140 can extend a distance "y" above the surface 110.

In some embodiments, the tension structure 118 comprises a drill rod 122 and a drilling mechanism 126. The drill rod 122 can be a generally cylindrical shape with an outer surface 128 and an inner passage 136. Although the shape is described as cylindrical, it is understood that the cross-sectional shape can be any geometric shape, for example, a square shape, a pentagon, a hexagon, an octagon, or a shape with any number of sides. The inner passage 136 can be configured for a flow of fluids, for example, a drilling mud. The drilling mechanism 126 can be an auger or any drilling bit suitable for subterranean formations, such as a rolling cutter bit, a fixed cutter bit, or a hybrid combination of rolling and fixed cutter bit. The drilling mechanism 126 can couple to the drilling rod 122. In some embodiments, a coupling can couple the drilling mechanism 126 to the drilling rod 122. The drilling mechanism 126 can include an inner passage for the flow of fluids from the drilling rod 122. In some embodiments, the drilling mechanism 126 can include a number of nozzles for directing drilling fluids out to cool and lubricate the cutting surfaces of the drilling mechanism 126. In some embodiments, the tension structure 118 can include two drilling rods, e.g., a first drilling rod 122A and a second drilling rod 122B, mechanically coupled with a coupling 124. Although two drilling rods are illustrated, it is understood that tension structure 118 can comprise 1, 2, 3, 4, 5, 6, 7, 8, 9, 10, or any number of drilling rods 122 joined or mechanically coupled with couplings 124. In some embodiments, the coupling 124 can be combined with the drilling rod 122, for example, the drilling rod can be box by pin construction so that each drilling rod 122 can mechanically couple to the next, for example, drilling rod 122A can couple with drilling rod 122B. Although the borehole 130 is illustrated as a vertical borehole, it is understood that the borehole 130 can be formed at an angle from a vertical centerline. For example, the borehole 130 can be formed at an angle of 0 degrees (e.g., vertical), 10 degrees, 20 degrees, 30 degrees, or any angle in the range of 0 to 60 degrees.

In some embodiments, a retractable tubing can be lowered from the drilling equipment to releasably connect to the sleeve 140. In an offshore environment, the retractable tubing is commonly referred to as a riser. The retractable tubing can fluidically connect the sleeve 140 to the drilling equipment to provide a flow path for the drilling fluids to return to the drilling equipment. In an onshore environment, the retractable tubing may be analogous to a bell nipple, wellhead, or combinations thereof.

A drilling assembly comprising the drilling mechanism 126 and at least one drill rod 122 can be lowered through the riser to drill the borehole 130 from surface 110 by a work string. The work string can rotationally and fluidically couple the drilling assembly to the drilling equipment. The drilling operation generally comprises rotating the drilling mechanism 126 with the drilling equipment while pumping drilling fluids through an inner passage of the drill rod 122. The drilling fluid cools the drilling mechanism 126 while returning drill cuttings to the top of the riser. The drilling operation can drill the borehole 130 to the desired depth from surface 110.

In some embodiments, the tension structure 118 can include an anchoring mechanism 154 coupled to the drilling rod 122. The anchoring mechanism 154 can mechanically couple the tension structure 118 to the sleeve 140. The coupling mechanism 154 can include a threaded portion, an anchoring lug, an anchoring assembly, or combinations thereof. The threaded portion of the anchoring mechanism 154 can threadingly couple with a matching threaded portion on the sleeve 140. The anchoring lug of the anchoring mechanism 154 can locate and anchor into a corresponding receptacle on the sleeve 140. The anchoring assembly of the anchoring mechanism 154 comprises a set of slips, also referred to as dogs, with a gripping structure that anchors to the sleeve 140 when urged into contact with the sleeve 140. In some embodiments, the anchoring mechanism 154 can sealingly engage the sleeve 140 to form a seal between the tension structure 118 and the sleeve 140. For example, the anchoring mechanism 154 can include a sealing structure that sealingly engages the outer surface of the anchoring mechanism 154 and/or the outer surface 128 of the drill rod 122 and the inner surface 144 of the sleeve 140. In some embodiments, the anchoring mechanism 154 comprises a valve mechanism that closes off an inner passage that fluidically connects to the inner passage 136 of the drilling rod 122.

In some embodiments, the tension structure 118 comprises a cage-like structure formed of bars, e.g. rebar, bend into a round shape or a spiral shape and bound or welded to straight bars, e.g., rebar. The tension structure 118 may be formed of any number of ribs, e.g., round sections, bound to the cage bars, e.g., straight sections, and extend from the bottom of the borehole 130 to the surface 110 or the top of sleeve 140 that extends the distance "y" above the surface.

In some embodiments, the grout 134 may fill the borehole 130 from the bottom 133 of the borehole 130 to fill a portion of the sleeve 140. In some embodiments, the grout 134 can fill the sleeve 140 to the top of sleeve 140 that extends the distance "y" above the surface. The grout 134 can be a cementitious material that cures or hardens into a solid structure. For example, the grout 134 can be Portland cement or a blend of Portland cement with various additives to tailor the cement for the borehole 130 and/or the borehole environment. For example, retarders or accelerators can be added to the wet grout (uncured grout) to slow down or speed up the curing process. In some embodiments, the grout 134 can be or include a polymer designed for subsea (underwater) environments. In some embodiments, the grout 134 can be cement blend designed to resist saltwater corrosion. In some embodiments, the grout 134 can have additives such as expandable elastomer particles or nanoparticles. In some embodiments, the grout that may include the grout 134 and the surface grout 138 can be a resin substantially absent BNNS, such as a first volume 42, introduced around a first region 121 and a second volume 44 introduced around a second region 125 of the micropile 120.

The grout 134 placed in the annular space 152 between the outer surface 128 of the tension structure 118 and the inner surface 132 of the borehole 130 can cure (harden) to form an anchor pile, also referred to as a micropile. In some embodiments, the term micropile 120 can refer to the sleeve 140, the tension structure 118, and the grout 134, e.g., a Portland cement, a blend of Portland cement, or a resin and BNNS, that has cured or hardened. In some embodiments, the tension structure 118 can be an elongated member 115, such as a substantially cylindrical piping 117, comprised in the micropile 120. After drilling is completed, the elongated member 115, such as the substantially cylindrical piping 117, can be filled with grout. In some embodiments, the term micropile 120 can refer to the pile alone, such as the pile driven into the subterranean formation 114.

In some embodiments, a template 150 can be used to transfer a load to one or more micropiles 120. The template 150 can comprise a socket 146 coupled to the micropile 120 via the sleeve 140. The socket 146 can include at least one load point, e.g., a shackle, that another structure or forces from another structure is attached to, e.g., an anchor cable. Another structure can apply a tension load, a compression load, a transverse load, a bending load or combinations thereof. For example, a floating structure can apply a combination of tension loads and transverse loads via the load point of the socket 146. In some embodiments, the socket 146 of the template 150 can be mechanically coupled to the micropile 120, for example, threadingly connected. In some embodiments, the socket 146 can be coupled to the micropile 120 with a surface grout 138, which in some embodiments may include boron nanotubes in form of, e.g., BNNS and a resin. The surface grout 138, which in some embodiments can be a second volume 44, can be placed between the outer surface 142 of the sleeve 140 and the inner surface 156 of the socket 146 in the second region 125 of the micropile 120. In some embodiments, a surface grout 138 can be placed between the sleeve 140 and the socket 146. The surface grout 138 can bond to the inner surface 156 of the socket 146 and the outer surface 142 of the sleeve 140. In some embodiments, a third volume 46, similar to the first volume 42, of grout 134 can be added above the surface grout 138 to fill the micropile 120 above the surface 110 to the overlying superstructure.

In some embodiments, the sleeve 140 comprises at least one load point for the operational loads. In some embodiments, the template 150 can be combined with the sleeve 140. In some embodiments, the template 150 can be mechanically coupled with the sleeve 140. In some embodiments, the template 150 can replace the sleeve 140.

In some embodiments, the template 150 comprises two or more sockets 146 joined by a load beam 148. For example, the template 150 can comprise a first socket 146A and a second socket 146B coupled to the load beam 148. A micropile 120 can couple with each socket 146. For example, a first micropile 120A having a diameter 123A can couple with a first socket 146A and a second micropile 120B can couple with a second socket 146B. The load point of the template 150 can be coupled to the load beam 148. In some embodiments, the template 150 can have two or more load points. Although two sockets 146A and 146B are described, it is understood that the template 150 can comprise 1, 2, 3, 4, 5, 6, 7, 8, 9, or any number of sockets 146 and load beams 148. The sockets 146 can be distributed about the template 150 in a geometric shape or a pattern. For example, the template 150 can be formed generally in the shape of a triangle by three load beams 148 coupled with the three sockets 146A-C. Although two anchor piles 120A-B are illustrated oriented in a parallel direction in FIG. 4, it is understood that the anchor piles 120A-B can be angled towards each other to form an acute angle or away from each other to form an obtuse angle. In some embodiments with more than two piles, the micropile 120 can be vertical, angled toward the center of the template 150, angled away from the center or the template 150, or any combination thereof.

The construction process for the micropile 120 can generally be the same for a location on land or offshore. The construction operation can comprise construction equipment suitable for drilling the borehole 130 and pumping equipment suitable for placing the grout 134. The construction equipment and micropile materials can be transported to a remote construction location for the construction operation. The design of the micropile 120 and/or template 150 can be transmitted or delivered to the construction operation. The template 150 can be installed at a surface 110 before or after a borehole 130 is created and the micropile positioned.

In some embodiments, the sleeve 140 can be driven, e.g., hammered, into the first formation 112 for a distance "X" from surface. The hammering method to drive the sleeve 140 into the ground is commonly referred to as pile-driving. In some embodiments, the sleeve 140 can be driven through the first formation 112 into the subterranean formation 114. In some embodiments, the sleeve 140 can be installed into a pre-drilled section of the borehole 130 or a portion of the borehole 130. For example, the borehole 130 can be drilled part-way, such as the distance "X" from surface, and the sleeve 140 can be installed into the portion of the borehole 130 that has been drilled.

In some embodiments, the grout 134 can be pumped down the inner passage 136 of the drill rod 122 and out the drilling mechanism 126 to fill the annular space 152. The grout 134 can fill the inner passage 136, the borehole 130, and the sleeve 140. In some embodiments, the grout 134 can be placed between the outer surface 142 of the sleeve 140 and the inner surface 132 of the borehole 130.

In some embodiments, the work string can be releasably coupled to the drilling assembly, e.g., drill rod 122A, or the anchoring mechanism 154. The drilling assembly can be detached from work string after the cement has been placed. In some embodiments, the anchoring mechanism 154 can be coupled between the work string and the drilling assembly. The work string can be detached from the anchoring mechanism 154 and thus, leaving the anchoring mechanism 154 and drilling assembly in the borehole 130.

The life span of the micropile 120 of FIG. 4 can depend on the complex stresses applied during its operational life. The strength of the structure can depend on the size and properties of the anchor base 100, for example, the dimensions of the borehole 130, the properties of the formation 114, the design of the tension structure 118, and the mechanical properties of at least one grout, e.g., the grout 134.

Figure 5:
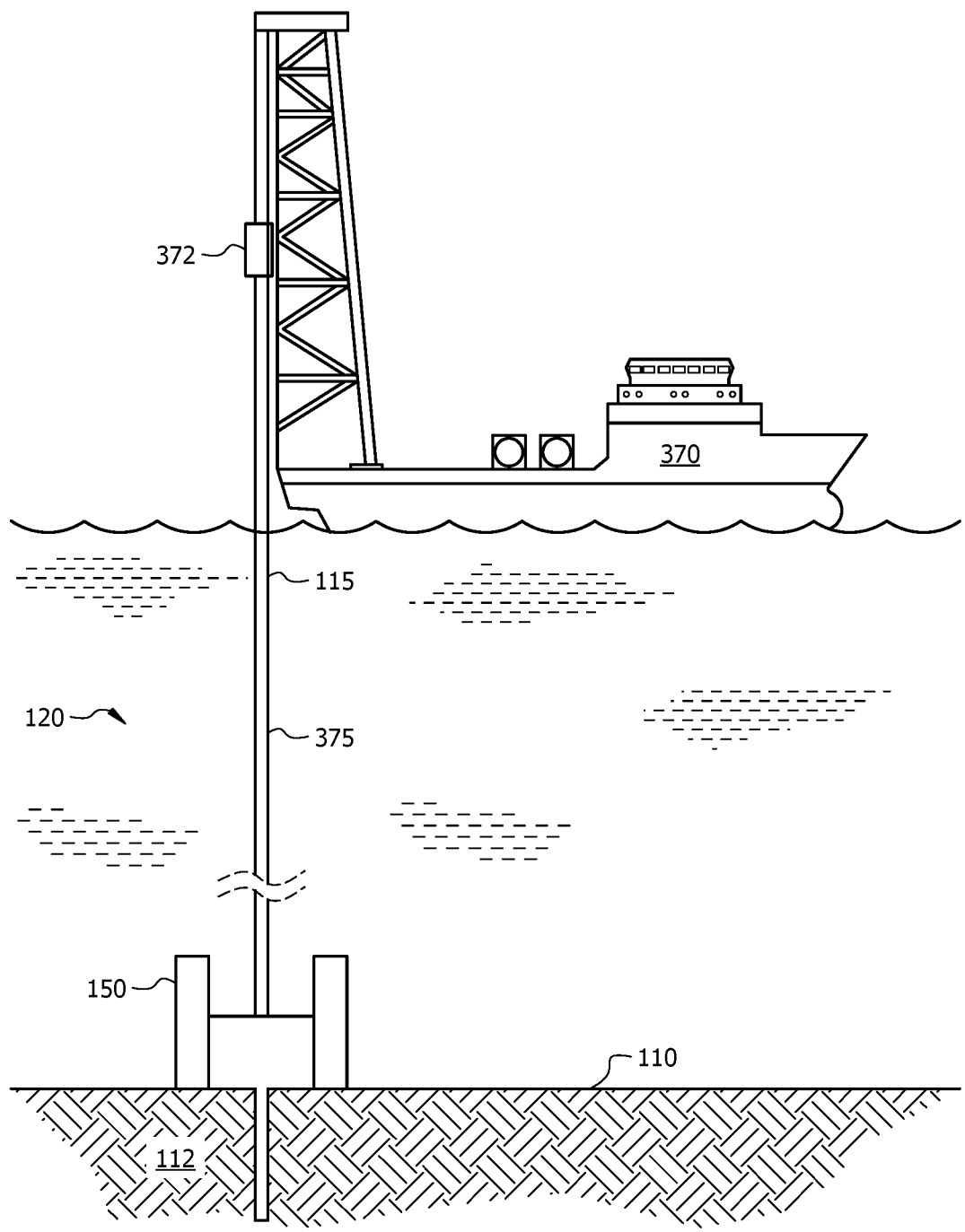
FIG. 5 is a cut-away illustration of an embodiment of installing a substantially cylindrical shaft.

In some other embodiments, instead of boring a hole, a template may be hammered to the surface and a micropile driven through a surface proximate to the template. Referring to FIG. 5, a barge 370 supporting a hammer 372 can drive a substantially cylindrical shaft 375 proximate to a template 150 secured to a subterranean formation 114. The substantially cylindrical shaft 375 can be driven past the surface 110 into the subterranean formation 114. One or more substantially cylindrical shafts 375 may be hammered or driven through the surface 110 proximate to the template 150 and an annulus may form around each driven substantially cylindrical shaft 375 due to formation fracture. The grout may be introduced to the substantially cylindrical shaft, an annulus, or a combination thereof, similarly as described above. Each substantially cylindrical shaft 375 may have a passageway, such as a driven and cast-in-situ micropile, for introducing the grout into and through the substantially cylindrical shaft 375, and subsequently filling the surrounding annulus. If the substantially cylindrical shaft 375 is solid and has no passageway, the grout may be introduced directly into the annulus surrounding the substantially cylindrical shaft 375. Once grouted, the substantially cylindrical shaft 375 in some embodiments comprises an elongated member 115 in a micropile 120 for supporting a superstructure subsequently coupled thereto.

Various interfaces can present different surfaces for grouting. A grout interface can be defined as a surface area or surface location that allows for debonding and sliding of different materials depending on the level of Coulomb friction, for example, an approximation of the dry frictional forces opposing tangential motion, between the respective surfaces.

Figure 6A:
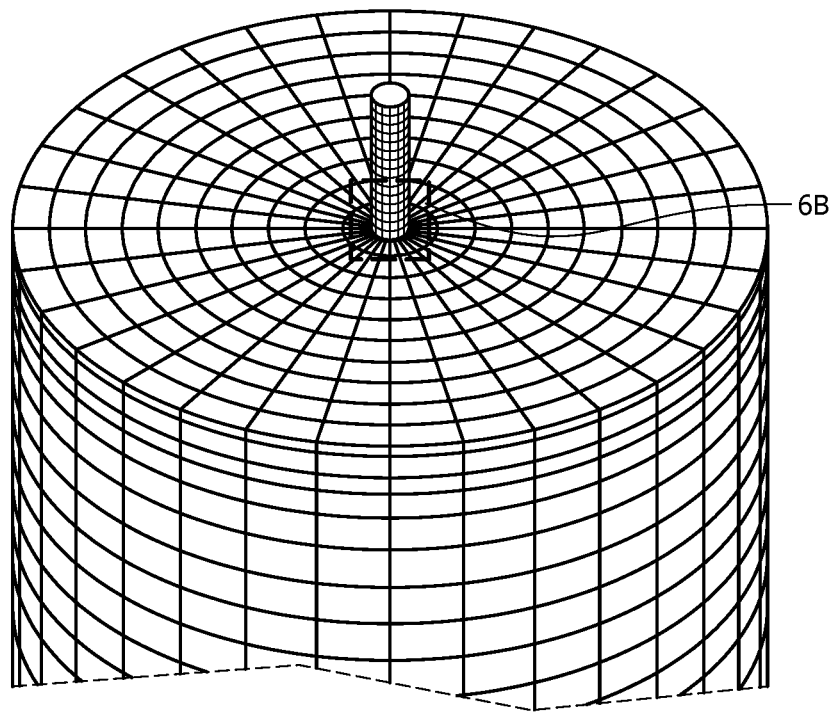
FIG. 6A is an illustration of an embodiment of a grout interface.
Figure 6B:
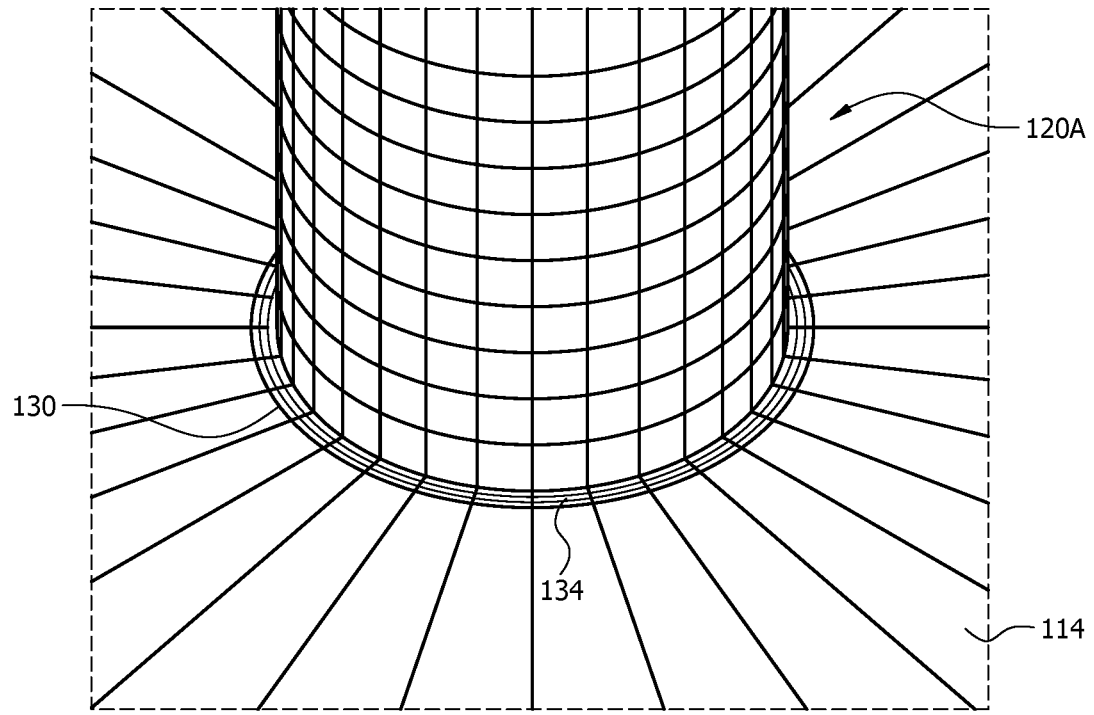
FIG. 6B is an enlarged view of area 6B of FIG. 6A.
Figure 7A:
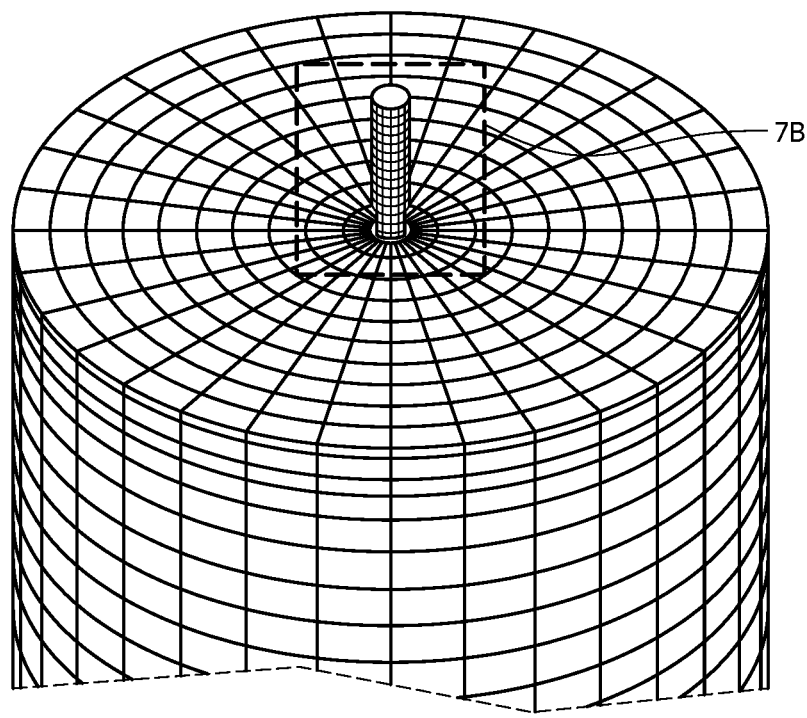
FIG. 7A is an illustration of another embodiment of a grout interface.
Figure 7B:
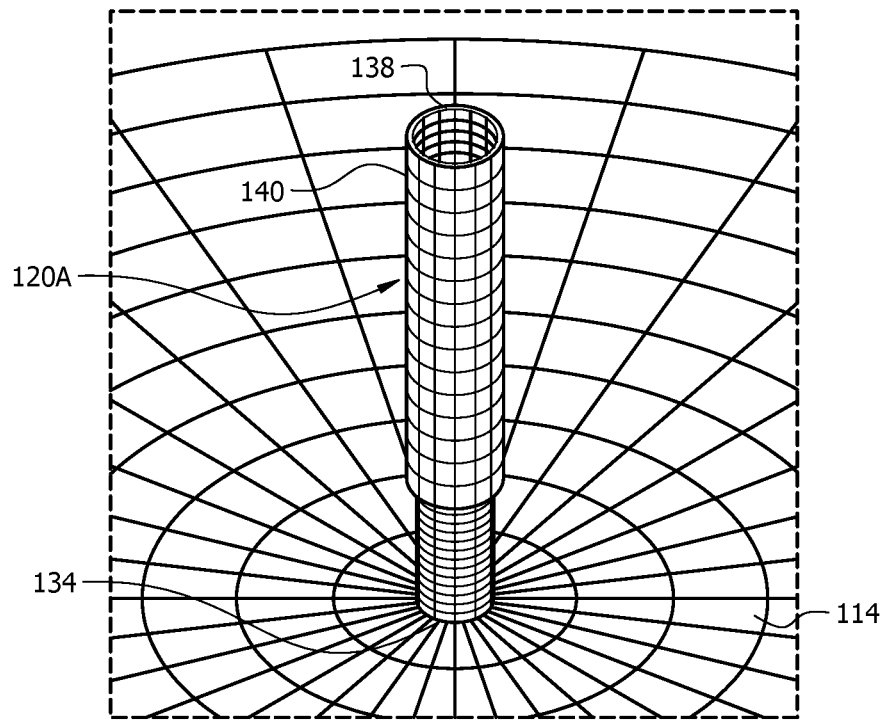
FIG. 7B is an enlarged view of area 7B of FIG. 7A.

In some embodiments, a grout interface is within the anchoring micropile, as depicted in FIGS. 6A-B. The micropile 120A including a tension structure 118 (not shown) and a volume of grout 134 placed into the borehole 130 within the formation 114. A first grout interface can be between the grout 134 and the inner surface of the borehole 130. In this example, the operational loads applied to the micropile 120A can be applied to the outer surface. In still another example of a grout interface in some embodiments is shown in FIGS. 7A-B, the micropile 120A comprises a tension structure 118 (not shown), a volume of two grouts, e.g., the grout 134 and the grout 138, and the sleeve 140.

Figure 8:
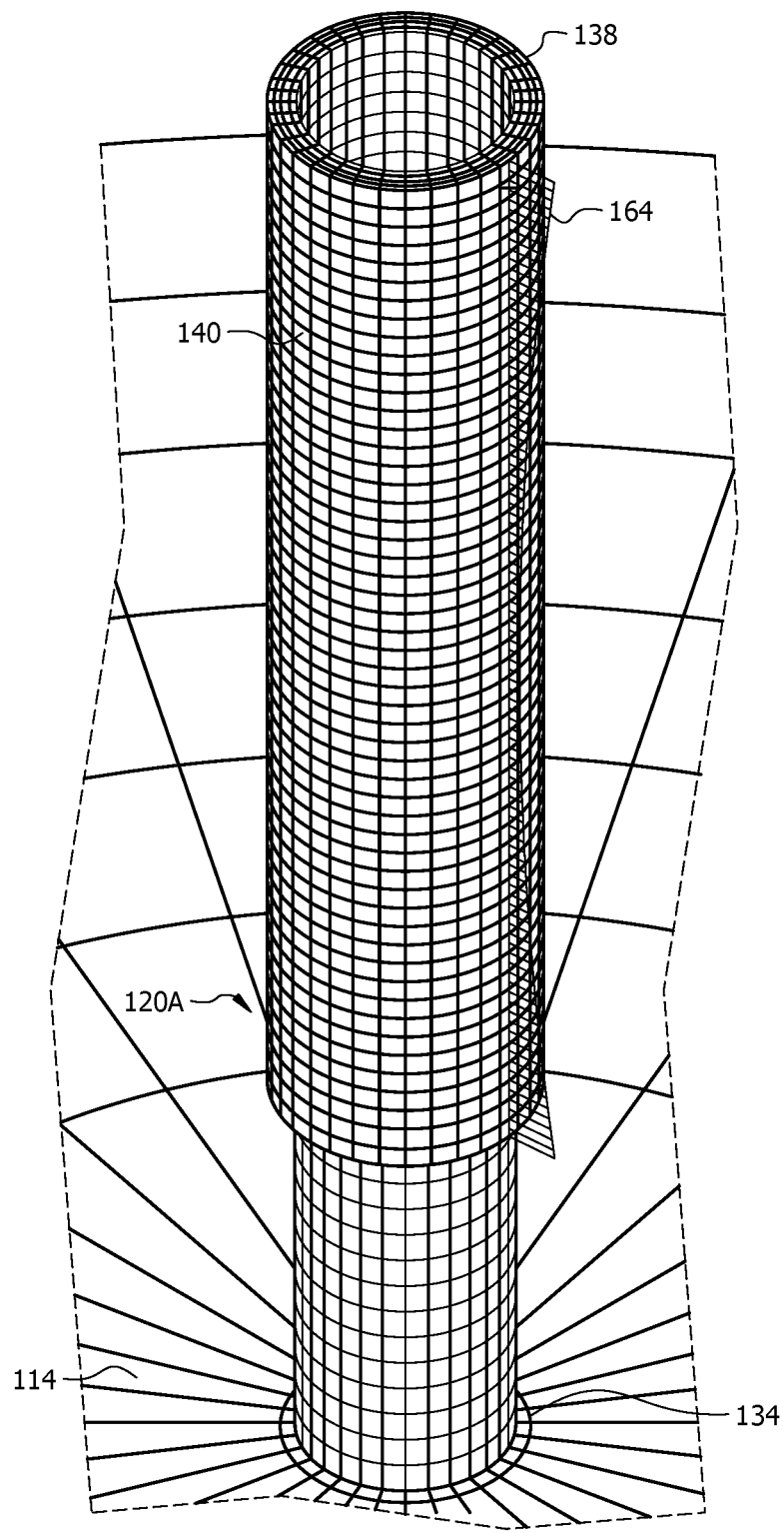
FIG. 8 is an illustration of a further embodiment of a grout interface.

In yet some other embodiments, as shown in FIG. 8, the sleeve 140 can be connected to a load point and, in the example shown, the loads can be applied along the length of the sleeve 140 of a micropile 120A via a loading edge 164. The first grout interface 134 previously described along with a second grout interface 138 can be located between the outer surface 142 of the sleeve 140 and the inner surface 132 of the borehole 130, as depicted in FIG. 4. In this example, the operational loads can be applied to the sleeve 140.

In some embodiments, micropile technology consists of single, or multiple (with a particular spatial arrangement) hollow micropiles drilled or driven into the ground. These micropiles can be bonded to the subterranean rock using a grouting material in between. In case of multiple micropiles, a surface structure can connect them together. Each of these multiple micropiles may bonded to a sleeve on the surface structure using another grouting material, as depicted in FIG. 8.

Thus, in some embodiments, there may two grouts 1) one that connects the micropile to the subterranean rock (substructure grout) and another that connects the micropile to the sleeve (surface grout) that is part of surface structure. Forces from the anchored installation are applied to the sleeve. Both surface and substructure grout can be sufficiently bonded to support the overlying, e.g., wind turbine, structure. Usually. forces can act along sleeve edge in three directions, e.g., axial forces, horizontal forces, and bending moments, along with torsional moments.

In some embodiments, the locations of various grout interfaces are shown in FIGS. 9A-B, namely a first grout interface 270 can be located between the inner surface 132 of the formation 114 and the grout 134. A second grout interface 272 can be located along the outer surface 142 of the sleeve 140 and the inner surface 132 of the borehole 130 and the grout 134 or the grout 138. A third grout interface 274 can be located along the inner surface 144 of the sleeve 140 and the grout 134 or the grout 138. A fourth grout interface 276 can be located along the outer surface 128 of the tension structure 118 and the grout 134.

For example, a table 160 of mechanical properties of an exemplary grout is shown in FIG. 10. In some embodiments, the grout can have a Young's Modulus of at least about 0.281 million pounds per inch (MPsi), a Poisson's ratio of at least about 0.33, a compressive strength of at least about 10,347 pounds per square inch (psi), a tensile strength of at least about 2,619 psi, or a combination thereof. In some embodiments, the mechanical properties of the grout 134 can be determined or validated by laboratory testing of a sample of the grout blend. Prior knowledge of designing blends can be helpful in the selection of the at least one grout blend. For example, blends that exhibit lower Young's modulus, high tensile and compressive strength are more likely to withstand the different complex loads exerted on the pile system.

EXAMPLES

The embodiments having been generally described, the following examples are given as particular embodiments of the disclosure and to demonstrate the practice and advantages thereof. It is understood that the examples are given by way of illustration and is not intended to limit the specification or the claims in any manner.

Analysis of a micropile assembly has shown that the surface grout made of typical Portland based systems may be insufficient for some regions receiving higher stress. Analysis of stress tolerances may involve creating a digital twin model of actual micropile geometry, both grouts, the sleeve and the subterranean rock. The mechanical properties of all four materials can be inputted to a model. Loads typical of a micropile application are exerted on the sleeve's loading edge. Resulting stresses on both grouts in compression and tension may be compared with compressive and tensile strengths respectively. The scaled result is fractional utilized capacity, 0 indicating intact grout and 1 indicating grout failure.

An example of the analysis of the resultant stresses of a grout is illustrated in FIGS. 4 and 11. In this example, the risk of failure in tension is evaluated with the range of 0 to 1. The top section 280A comprises a sleeve, e.g., sleeve 140, with a volume of surface grout, e.g., the grout 138. The bottom section 282A comprises the tension structure 118 (not shown) with a volume of subterranean grout, e.g., the grout 134. Although the top section 280 and bottom section 282 are illustrated with a separation, it is understood that the separation is for clarity and that the two sections can be a continuous assembly (as shown in FIG. 4). On the left hand portion of the example shown, top section 280A and bottom section 282A are placed in tension. The analysis is indicative of a probability of failure (rating between 0.88 to 1.00) for a portion of both the top section 282A and the top and bottom section 280A. Particularly, the top 5% by height of the section 282A is subject to a probability of failure and the top 9% and the bottom 57% of the section 280A is subject to a probability of failure.

Figure 11B:
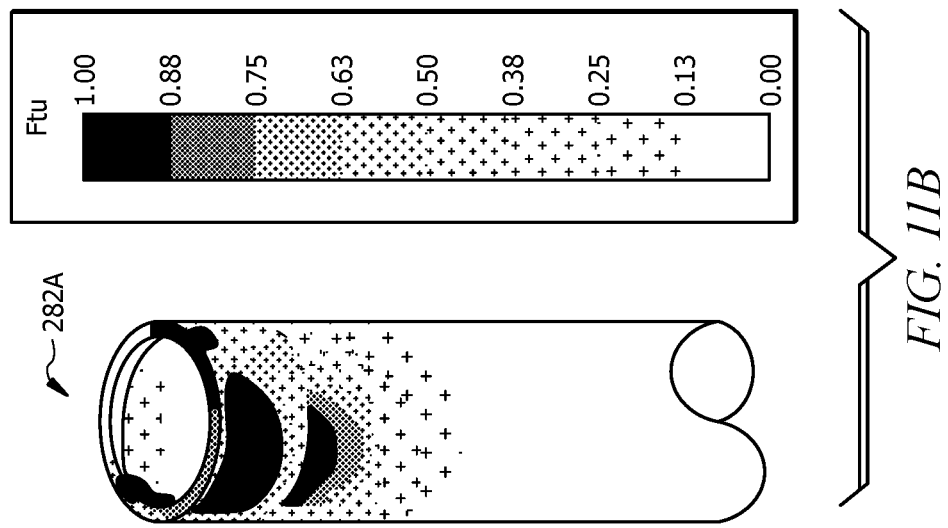
FIGS. 11A-B are illustrations of stress distribution along grout interfaces.
Figure 11A:
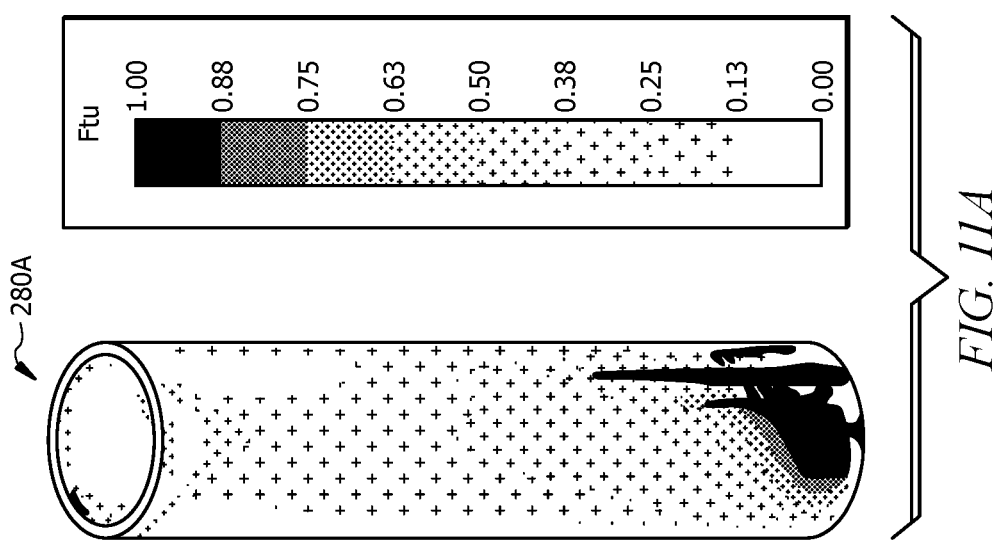

Particularly, FIGS. 11A-B demonstrate the utilized capacity in tension for both grouts when loaded to 100% of the typical values experienced by each micropile. A significant portion of surface grout shows risk of failure in tension. This result uses a surface grout with a tensile strength of about 1000 psi, which is on a higher side for typical Portland cement based design. Results are not shown for a compression case as the failure risk in compression is not as high as in tension.

Figure 12B:
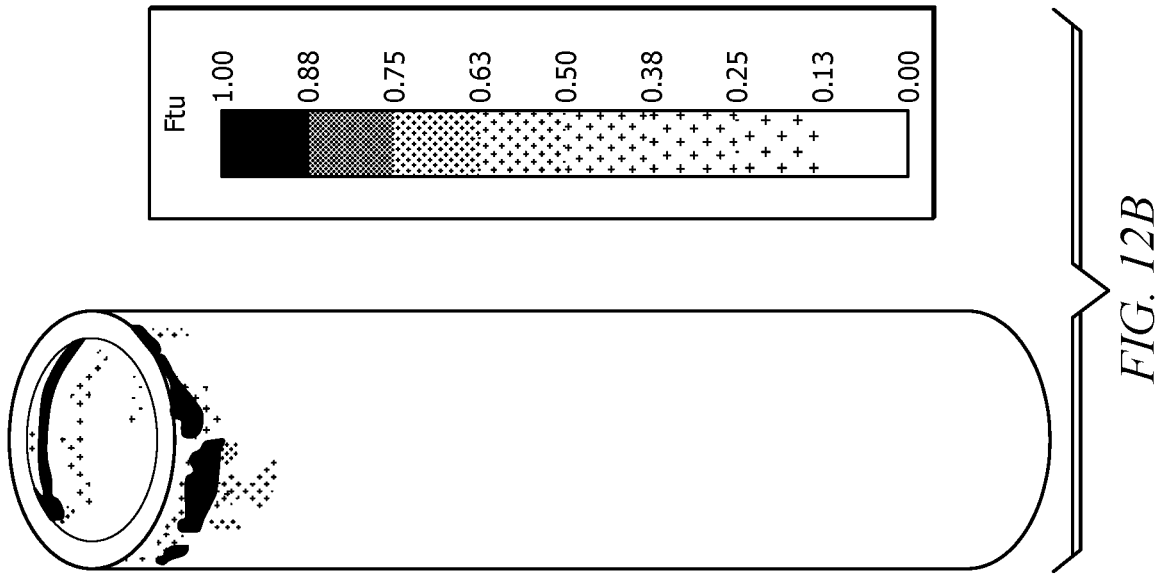
FIGS. 12A-B are illustrations of stress distribution of an embodiment along grout interfaces.
Figure 12A:
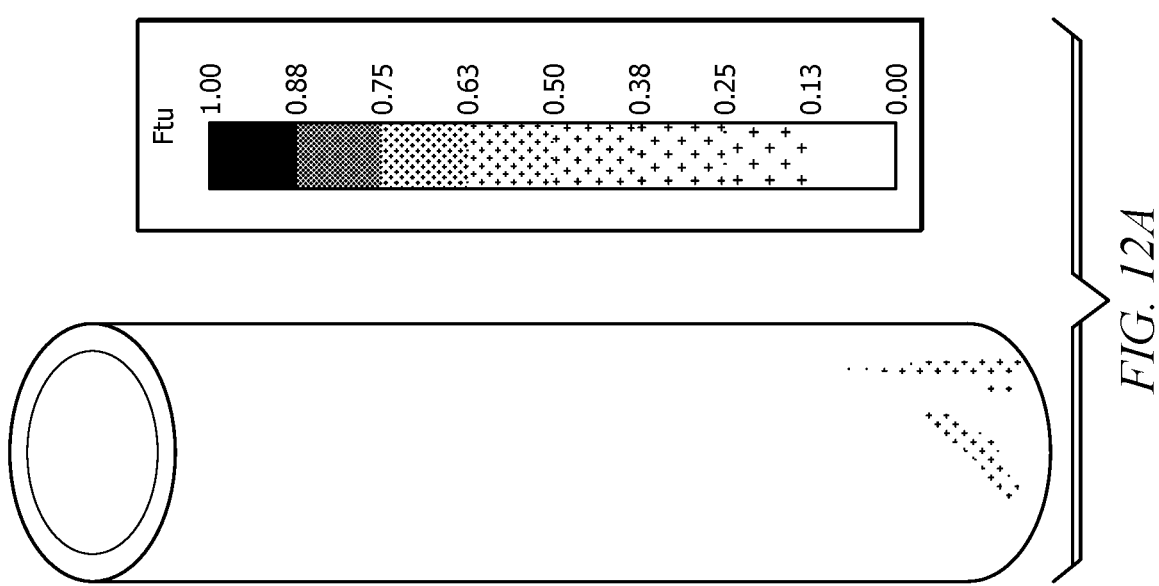

A grout with premium tensile properties can be designed. As depicted in FIGS. 12A-B, a surface grout including a resin and BNNS is analyzed with respect to a micropile assembly. Properties of this grout can be found in the table of FIG. 10, discussed above.

With respect to the example in FIGS. 12A-B, a resin-based material can be prepared by combining 5.3 grams of BNNS with 186.3 grams of digylcidyl ether of bisphenol F epoxy resin (DGEBF) liquid. The BNNS can be dispersed in the DGEBF using an ultrasonic probe sonicator. The BNNS/DGEBF composition may be sonicated for three five-minute intervals. Each sonication interval can require 23 kilojoules (kJ) of energy. The BNNS/DGEBF resin-based material can cool to room temperature prior to commencing the next sonication interval. When no visual observation of particulate settling is observed, 72.1 grams of diethyltoluene diamine hardener and 7.4 grams of 2,4,6-Tris(dimethylaminomethyl) phenol accelerator can added to the resin-based material. The resin-based material may be shaken and then allowed to cure under ambient laboratory conditions for seven days. A control sample containing the same resin, hardener, and accelerator ratios without the BNNS can be prepared and cured in parallel under laboratory conditions for seven days (relevant to FIGS. 11A-B).

As depicted in FIGS. 12A-B, the fractional utilized capacity is in tension. This surface grout shows no risk of failure, as depicted in FIG. 12A. The substructure grout demonstrates little risk of failure, as depicted in FIG. 12B. Only a portion of substructure grout is shown. This model demonstrates, particularly as compared to FIGS. 11A-B, that the grout including the resin and BNNS has significant and unexpected improved mechanical properties (e.g., tensile strength) suitable for use in bonding structures that experience severe tensile loads, such as micropiles supporting wind turbines.

ADDITIONAL DISCLOSURE

The following are non-limiting, specific embodiments in accordance and with the present disclosure:

A first embodiment which is a pile 120 comprises: an elongated member 115; and a grout 138 at least partially coupled to and for anchoring the elongated member 115, comprising: a resin; and a boron nitride nanotube structure 5 comprising a boron nitride nanotube 10 having a hexagonal boron nitride structure 15 epitaxial to the boron nitride nanotube 10, wherein the grout 134, 138 has a first volume 42 substantially free of the boron nitride nanotube structure 5, and a second volume 44 comprising the boron nitride nanotube structure 5.

A second embodiment which is the pile 120 of the first embodiment, wherein the elongated member 115 comprises a substantially cylindrical piping 117 forming an inner passage 136 filled with the grout 134, 138 and the pile 120 has a pile diameter 123 of no more than about 15 inches.

A third embodiment which is the pile 120 of the first embodiment or the second embodiment, wherein the elongated member 115 comprises a substantially cylindrical shaft 375.

A fourth embodiment which is the pile 120 of any of the proceeding embodiments, further comprising a sleeve 140 at least partially surrounding the substantially cylindrical piping 117 at its outer surface 128.

A fifth embodiment which is the pile 120 of any of the proceeding embodiments, wherein the substantially cylindrical piping 117 is positioned in a first formation 112 having a surface 110 and a sleeve 140 at least partially surrounds the substantially cylindrical piping 117 proximate to the surface 110.

A sixth embodiment which is the pile 120 of any of the proceeding embodiments, wherein the substantially cylindrical piping 117 comprises a first drilling rod 122A and a second drilling rod 122B fastened with a coupling 124.

A seventh embodiment which is the pile 120 of any of the proceeding embodiments, wherein the pile 120 comprises a micropile 120 and the elongated member 115 comprises a concrete, a metal, or a combination thereof.

An eighth embodiment which is the pile 120 of any of the proceeding embodiments, wherein the first volume 42 comprises no more than about 0.1%, by weight, of the boron nitride nanotube structure 5 based on the total weight of the first volume 42 of the grout 134.

A ninth embodiment which is the pile 120 of any of the proceeding embodiments, wherein the second volume 44 comprises a concentration of the boron nitride nanotube structure 5 of about 0.1% to about 10%, by weight, based on total weight of the second volume 44 of the grout 138.

A tenth embodiment which is the pile 120 of any of the proceeding embodiments, wherein the grout 134 comprises the first volume 42 comprising a cementitious material and the second volume 44 comprising the resin and the boron nitride nanotube structure 5.

An eleventh embodiment which is the pile 120 of any of the proceeding embodiments, wherein the cementitious material comprises a Portland cement, a pozzolana cement, a gypsum cement, a shale cement, an acid cement, a base cement, a phosphate cement, a high alumina content cement, a slag cement, a silica cement, a high alkalinity cement, a magnesia cement, lime, or a combination thereof.

A twelfth embodiment which is the pile 120 of any of the proceeding embodiments, wherein the grout 134 comprise a third volume substantially free of the boron nitride nanotube structure 5.

A thirteenth embodiment which is the pile 120 of any of the proceeding embodiments, wherein the 20 penetrates a surface 110 into a borehole 130, and the first volume 42 is near a bottom 133 of the borehole 130 and the second volume 44 is near the surface 110.

A fourteenth embodiment which is the pile 120 of any of the proceeding embodiments, wherein the grout 134, 138 is introduced to secure the pile 120 in a borehole 130.

A fifteenth embodiment which is the pile 120 of any of the proceeding embodiments, wherein the first volume 42 substantially free of the boron nitride nanotube structure 5 is introduced at a first region 121 of the pile 120 having a lower probability of failure than the second volume 44 comprising boron nitride nanotube structure 5 introduced at a second region 125.

A sixteenth embodiment which is the pile 120 of any of the proceeding embodiments, wherein the resin comprises a resin selected from the group consisting of a shellac, a polyamide, a silyl-modified polyamide, a polyester, a polycarbonate, a polycarbamate, a urethane, a polyurethane, a natural resin, an olefin resin, a cyclic olefin-based resin, an epoxy-based resin (e.g., epoxy-amine or epoxy-anhydride), a furan-based resin, a phenolic-based resin, a urea-aldehyde resin, a phenol-phenol formaldehyde-furfuryl alcohol resin, a bisphenol A diglycidyl ether resin, a butoxymethyl butyl glycidyl ether resin, a bisphenol A epichlorohydrin resin, a bisphenol F resin, a bisphenol S resin, a diglycidyl ether of bisphenol F epoxy resin, an acrylic acid polymer, an acrylic acid ester polymer, an acrylic acid homopolymer, an acrylic acid ester homopolymer, a poly(methyl acrylate), a poly (butyl acrylate), a poly(2-ethylhexyl acrylate), an acrylic acid ester copolymer, a methacrylic acid derivative polymer, a methacrylic acid homopolymer, a methacrylic acid ester homopolymer, a poly(methyl methacrylate), a poly(butyl methacrylate), a poly(2-ethylhexyl methacrylate), an acrylamidomethylpropane sulfonate polymer or a copolymer or derivative thereof, an acrylic acid/acrylamidomethylpropane sulfonate copolymer, a trimer acid, a fatty acid, a fatty acid derivative, maleic anhydride, acrylic acid, a polyester, a polycarbonate, a polycarbamate, an aldehyde, formaldehyde, a dialdehyde, glutaraldehyde, a hemiacetal, an aldehyde-releasing compound, a diacid halide, a dihalide, a dichloride, a dibromide, a polyacid anhydride, citric acid, an epoxide, furfuraldehyde, an aldehyde condensate, a silyl-modified polyamide, a condensation reaction product of a polyacid and a polyamine, or any combination thereof.

A seventeenth embodiment which is the pile 120 of any of the proceeding embodiments, wherein the grout 134, 138 has a Young's Modulus of at least about 0.281 million pounds per inch (MPsi), a Poisson's ratio of at least about 0.33, a compressive strength of at least about 10,347 pounds per square inch (psi), a tensile strength of at least about 2,619 psi, or a combination thereof.

An eighteenth embodiment which is the pile 120 of any of the proceeding embodiments, wherein the second volume 44 further comprises a hardening agent, an accelerator, or a combination thereof.

A nineteenth embodiment which is a base anchor 100 comprising the pile 120 of any of the proceeding embodiments.

A twentieth embodiment which is the base anchor 100 of the nineteenth embodiment, further comprising a template 150 and wherein the pile 120 is a first pile 120A.

A twenty-first embodiment which is the base anchor 100 of the nineteenth embodiment or twentieth embodiment, further comprising a second pile 120B wherein the template 150 is coupled to the first and second piles 120A-B.

A twenty-second embodiment which is the base anchor 100 of any of the nineteenth embodiment through the twenty-first embodiment, wherein the template 150 further comprises a load beam 148.

A twenty-third embodiment which is the base anchor 100 of any of the nineteenth embodiment through the twenty-second embodiment, further comprising a first socket 146A at least partially surrounding a sleeve 140 of the first pile 120A and coupled to the load beam 148.

A twenty-fourth embodiment which is a method of securing a pile 120, comprises: introducing a grout 134, 138 into a borehole 130, wherein the grout 134, 138 comprises: a first volume 42 substantially free of boron nitride nanotube structure 5 introduced at a first region 121 of the pile 120; and a second volume 44 comprising a resin and boron nitride nanotube structure 5 introduced at a second region 125 of the pile 120.

A twenty-fifth embodiment which is the method of the twenty-fourth embodiment, wherein the first volume 42 comprises no more than about 0.1%, by weight, of the boron nitride nanotube structure 5, based on the total weight of the first volume 42 of the grout 134.

A twenty-sixth embodiment which is the method of the twenty-fourth embodiment or the twenty-fifth embodiment, wherein the second volume 44 comprises a concentration of the boron nitride nanotube structure 5 of about 0.1% to about 10%, by weight, based on the total weight of the second volume 44 of the grout 138.

A twenty-seventh embodiment which is the method of any of the twenty-fourth embodiment through twenty-sixth embodiment, further comprising introducing a third volume 46 substantially free of the boron nitride nanotube structure 5.

A twenty-eighth embodiment which is the method of any of the twenty-fourth embodiment through twenty-seventh embodiment, wherein the third volume 46 comprises no more than about 0.1%, by weight, of the boron nitride nanotube structure 5, based on the total weight of the third volume 46.

A twenty-ninth embodiment which is the method of any of the twenty-fourth embodiment through twenty-eighth embodiment, wherein: the first volume 42 comprises a first cementitious material, the second volume 44 comprises a resin and boron nitride nanotube structure 5; and further comprising a third volume 46 comprising a second cementitious material.

A thirtieth embodiment which is the method of any of the twenty-fourth embodiment through twenty-ninth embodiment, further comprising introducing a spacer 52 between the first and second volumes 42 and 44.

A thirty-first embodiment which is the method of any of the twenty-fourth embodiment through thirtieth embodiment, further comprises introducing a fourth volume 48 comprising a second resin and boron nitride nanotube structure 5, wherein: the spacer 52 is a first spacer 52; and introducing a second spacer 54 between the second and third volumes 44 and 46 and a third spacer 56 between the third and fourth volumes 46 and 48.

A thirty-second embodiment which is the method of any of the twenty-fourth embodiment through thirty-first embodiment, wherein each of the first, second, and third spacers 52, 54, and 56 comprises a hydrocarbon-based material.

A thirty-third embodiment which is the method of any of the twenty-fourth embodiment through thirty-second embodiment, further comprising, prior to introducing the grout 134, anchoring a template 150 to a surface 110.

A thirty-fourth embodiment which is the method of any of the twenty-fourth embodiment through thirty-third embodiment, further comprising, prior to introducing the grout 134, driving the pile 120 into a surface 110.

A thirty-fifth embodiment which is the method of any of the twenty-fourth embodiment through thirty-fourth embodiment, wherein the borehole 130 is a first borehole 130A, further comprising: drilling first and second boreholes 130A-B through the surface 110 proximate to a template 150.

A thirty-sixth embodiment which is the method of any of the twenty-fourth embodiment through thirty-fifth embodiment, wherein the pile 120 is a first pile 120A and the second borehole 130B receives a second pile 120B, and the template 150 further comprises first and second sockets 146A and 148B, wherein the first socket 146A is coupled to the first pile 120A and the second socket 146A is coupled to the second pile 120B.

A thirty-seventh embodiment which is the method of any of the twenty-fourth embodiment through thirty-sixth embodiment, wherein the first pile 120A extends from a bottom 133 of the first borehole 130A to above the surface 110, and a sleeve 140 is positioned proximate to the first pile 120A uphole from the bottom 133 of the first borehole 130A and extending above the surface 110, and the first volume 42 is introduced to the bottom 133 of the first borehole 130A and the second volume 44 is introduced uphole of the first volume 42 to grout 134 the pile 120 near the surface 100 to at least a portion of the sleeve 140.

A thirty-eighth embodiment which is the method of any of the twenty-fourth embodiment through thirty-seventh embodiment, wherein each of the first and second piles 120A-B has a diameter 123 of no more than about fifteen inches.

A thirty-ninth embodiment which is the method of securing a pile 120, comprises: anchoring a template 150 to a surface 110; drilling a borehole 130 proximate to the template 150 underneath the surface 110 into a subterranean formation 114 to form a bottom 133; positioning the pile 120 having a diameter 123 of no more than about fifteen inches from the bottom 133 of the borehole 130 to extend above the surface 110; positioning a sleeve 140 proximate to the pile 120 uphole from the bottom 133 of the borehole 130 and extending above the surface 110; coupling a socket 146 to the sleeve 140; and introducing a grout 134 into the borehole 130, wherein the grout 134 comprises a resin and boron nitride nanotube structure 5.

A fortieth embodiment which is the method of securing a pile 120, comprises: anchoring a template 150 to a surface 110; driving a pile 120 having a diameter 123 of no more than about fifteen inches through the surface 110 proximate to the template 150, wherein the pile 120 has one end 127 driven into a subterranean formation 114 and another end 129 extending above the surface 110; positioning a sleeve 140 proximate to the pile 120 uphole from the driven end 127 of the pile 120 and extending above the surface 110; coupling a socket 146 to the sleeve 140; and introducing a grout 134 into an inner passage 136 of the pile 120, wherein the grout 134 comprises a resin and boron nitride nanotube structure 5.

A forty-first embodiment which is the method of grouting a pile 120, comprises: drilling a borehole 130 underneath a surface 110 into a subterranean formation 114 to form a bottom 133; positioning the pile 120 from the bottom 133 of the borehole 130 and extending above the surface 110; positioning a sleeve 140 proximate to the pile 120 uphole from the bottom 133 of the borehole 130 and extending above the surface 110; anchoring a template 150 proximate to the pile 120 wherein the template 150 is coupled to the pile 120; and introducing a first volume 42, a second volume 44, and a third volume 46; wherein the first volume 42 is introduced to the bottom 133 of the borehole 130, the second volume 44 comprising a resin and boron nitride nanotube structure 5 is introduced at the pile 120 proximate to the surface 110, and the third volume 46 is introduced above the second volume 44.

A forty-second embodiment which is the method of the forty-first embodiment, wherein the spacers 52 and 54 are introduced between the first, second, and third volumes 42, 44, and 46.

A forty-third embodiment which is a grout 134 having a resin-based system for anchoring at least one pile 120, comprises: a resin; and a boron nitride nanotube structure 5 comprising a boron nitride nanotube 10 having a hexagonal boron nitride structure 15 epitaxial to the boron nitride nanotube 10, wherein the grout 134 has a first volume 42 substantially free of the boron nitride nanotube structure 5 and a second volume 44 comprising the boron nitride nanotube structure 5.

A forty-fourth embodiment which is the grout 134 of the forty-third embodiment, wherein the first volume 42 is substantially free of boron nitride nanotube structure 5 comprises no more than about 0.1%, by weight, boron nitride nanotube structure 5, based on the total weight of the first volume 42 of the grout 134.

A forty-fifth embodiment which is the grout 134 of the forty-third embodiment or the forty-fourth embodiment, wherein the second volume 44 comprises a concentration of the boron nitride nanotube structure 5 of about 0.1% to about 10%, by weight, based on the total weight of the second volume 44 of the grout 138.

A forty-sixth embodiment which is the grout 134 of any of the forty-third embodiment through the forty-fifth embodiment, wherein the grout 134 comprises the first volume 42 comprising a cementitious material and the second volume 44 comprising the resin and the boron nitride nanotube structure 5.

A forty-seventh embodiment which is the grout 134 of any of the forty-third embodiment through the forty-sixth embodiment, wherein the cementitious material comprises a Portland cement, a pozzolana cement, a gypsum cement, a shale cement, an acid cement, a base cement, a phosphate cement, a high alumina content cement, a slag cement, a silica cement, a high alkalinity cement, a magnesia cement, lime, or a combination thereof.

A forty-eighth embodiment which is the grout 134 of any of the forty-third embodiment through the forty-seventh embodiment, wherein the grout 134 comprises a third volume 46 substantially free of boron nitride nanotube structure 5.

A forty-ninth embodiment which is the grout 134 of any of the forty-third embodiment through the forty-eighth embodiment, wherein the boron nitride nanotube structure 5 is dispersed in the resin with sonication.

A fiftieth embodiment which is the grout 134 of any of the forty-third embodiment through the forty-ninth embodiment, wherein the grout 134 is introduced to secure at least one pile 120 in a borehole 130.

A fifty-first embodiment which is the grout 134 of any of the forty-third embodiment through the fiftieth embodiment, wherein the first volume 42 substantially free of the boron nitride nanotube structure 5 is introduced at a first region 121 of the pile 120 having a lower probability of failure than the second volume 44 comprising the boron nitride nanotube structure 5 introduced at a second region 125.

A fifty-second embodiment which is the grout 134 of any of the forty-third embodiment through the fifty-first embodiment, wherein the resin comprises a resin selected from the group consisting of a shellac, a polyamide, a silyl-modified polyamide, a polyester, a polycarbonate, a polycarbamate, a urethane, a polyurethane, a natural resin, an olefin resin, a cyclic olefin-based resin, an epoxy-based resin (e.g., epoxy-amine or epoxy-anhydride), a furan-based resin, a phenolic based resin, a urea-aldehyde resin, a phenol-phenol formaldehyde-furfuryl alcohol resin, a bisphenol A diglycidyl ether resin, a butoxymethyl butyl glycidyl ether resin, a bisphenol A epichlorohydrin resin, a bisphenol F resin, a bisphenol S resin, a diglycidyl ether of bisphenol F epoxy resin, an acrylic acid polymer, an acrylic acid ester polymer, an acrylic acid homopolymer, an acrylic acid ester homopolymer, a poly(methyl acrylate), a poly(butyl acrylate), a poly(2-ethylhexyl acrylate), an acrylic acid ester copolymer, a methacrylic acid derivative polymer, a methacrylic acid homopolymer, a methacrylic acid ester homopolymer, a poly(methyl methacrylate), a poly(butyl methacrylate), a poly(2-ethylhexyl methacrylate), an acrylamidomethylpropane sulfonate polymer or a copolymer or a derivative thereof, an acrylic acid/acrylamidomethylpropane sulfonate copolymer, a trimer acid, a fatty acid, a fatty acid derivative, maleic anhydride, acrylic acid, a polyester, a polycarbonate, a polycarbamate, an aldehyde, formaldehyde, a dialdehyde, glutaraldehyde, a hemiacetal, an aldehyde-releasing compound, a diacid halide, a dihalide, a dichloride, a dibromide, a polyacid anhydride, citric acid, an epoxide, furfuraldehyde, an aldehyde condensate, a silyl-modified polyamide, a condensation reaction product of a polyacid and a polyamine, or any combination thereof.

A fifty-third embodiment which is the grout 134 of any of the forty-third embodiment through the fifty-second embodiment, wherein the second volume 44 comprising the concentration of the boron nitride nanotube structure 5 further comprises a hardening agent.

A fifty-fourth embodiment which is the grout 134 of any of the forty-third embodiment through the fifty-third embodiment, wherein the second volume 44 comprising the concentration of the boron nitride nanotube structure 5 further comprises an accelerator.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A pile, comprising:
   an elongated member; and
   a grout at least partially coupled to and for anchoring the elongated member,
   comprising:
   a resin; and
   a boron nitride nanotube structure comprising a boron nitride nanotube having a hexagonal boron nitride structure epitaxial to the boron
   nitride nanotube,
   wherein the grout has a first volume substantially free of the boron nitride nanotube structure, and a second volume comprising the boron nitride nanotube structure, and
   wherein the second volume is loaded at a region of the pile subject to higher tensile loads than another region of the pile loaded with the first volume.

2. The pile of claim 1, wherein the elongated member comprises a substantially cylindrical piping forming an inner passage filled with the grout and the pile has a pile diameter of no more than about 15 inches.

3. The pile of claim 1, wherein the elongated member comprises a substantially cylindrical shaft.

4. The pile of claim 1, further comprising a sleeve at least partially surrounding a substantially cylindrical piping at its outer surface.

5. The pile of claim 2, wherein the substantially cylindrical piping is positioned in a first formation having a surface and a sleeve at least partially surrounds the substantially cylindrical piping proximate to the surface.

6. The pile of claim 2, wherein the substantially cylindrical piping comprises a first drilling rod and a second drilling rod fastened with a coupling.

7. The pile of claim 1, wherein the pile comprises a micropile and the elongated member comprises a concrete, a metal, or a combination thereof.

8. The pile of claim 1, wherein the first volume comprises no more than about 0.1%, by weight, of the boron nitride nanotube structure based on a total weight of the first volume of the grout.

9. The pile of claim 8, wherein the second volume comprises a concentration of the boron nitride nanotube structure of about 0.1% to about 10%, by weight, based on total weight of the second volume of the grout.

10. The pile of claim 1, wherein the grout comprises the first volume comprising a cementitious material and the second volume comprising the resin and the boron nitride nanotube structure.

11. The pile of claim 1, wherein the resin comprises a resin selected from the group consisting of a shellac, a polyamide, a silyl-modified polyamide, a polyester, a polycarbonate, a polycarbamate, a urethane, a polyurethane, a natural resin, an olefin resin, a cyclic olefin-based resin, an epoxy-amine or an epoxy-anhydride resin, a furan-based resin, a phenolic-based resin, a urea-aldehyde resin, a phenol-phenol formaldehyde-furfuryl alcohol resin, a bisphenol A diglycidyl ether resin, a butoxymethyl butyl glycidyl ether resin, a bisphenol A epichlorohydrin resin, a bisphenol F resin, a bisphenol S resin, a diglycidyl ether of bisphenol F epoxy resin, an acrylic acid polymer, an acrylic acid ester polymer, an acrylic acid homopolymer, an acrylic acid ester homopolymer, a poly(methyl acrylate), a poly(butyl acrylate), a poly(2-ethylhexyl acrylate), an acrylic acid ester copolymer, a methacrylic acid derivative polymer, a methacrylic acid homopolymer, a methacrylic acid ester homopolymer, a poly(methyl methacrylate), a poly(butyl methacrylate), a poly(2-ethylhexyl methacrylate), an acrylamidomethylpropane sulfonate polymer or a copolymer or a derivative thereof, an acrylic acid/acrylamidomethylpropane sulfonate copolymer, a trimer acid, a fatty acid, a fatty acid derivative, maleic anhydride, acrylic acid, a polyester, a polycarbonate, a polycarbamate, an aldehyde, formaldehyde, a dialdehyde, glutaraldehyde, a hemiacetal, an aldehyde-releasing compound, a diacid halide, a dihalide, a dichloride, a dibromide, a polyacid anhydride, citric acid, an epoxide, furfuraldehyde, an aldehyde condensate, a silyl-modified polyamide, a condensation reaction product of a polyacid and a polyamine, or any combination thereof.

12. The pile of claim 1, wherein the grout has a Young's Modulus of at least about 0.281 million pounds per inch (MPsi), a Poisson's ratio of at least about 0.33, a compressive strength of at least about 10,347 pounds per square inch (psi), a tensile strength of at least about 2,619 psi, or a combination thereof.

13. The pile of claim 1, wherein the second volume further comprises a hardening agent, an accelerator, or a combination thereof.

14. A base anchor comprising the pile of claim 1.

15. The base anchor of claim 14, further comprising a template and wherein the pile is a first pile.

16. The base anchor of claim 15, further comprising a second pile wherein the template is coupled to the first and second piles.

17. A method of securing a pile, comprising:
   introducing a grout into a borehole,
   wherein the grout comprises:
   a first volume substantially free of boron nitride nanotube structure introduced at a first region of the pile; and
   a second volume comprising a resin and boron nitride nanotube structure introduced at a second region of the pile, and
   wherein the second region is subject to greater tensile loads than the first region.

18. The method of claim 17, wherein the first volume comprises no more than about 0.1%, by weight, of the boron nitride nanotube structure, based on a total weight of the first volume of the grout.

19. The method of claim 17, wherein the second volume comprises a concentration of the boron nitride nanotube structure of about 0.1% to about 10%, by weight, based on a total weight of the second volume of the grout.

20. A mixture comprising a grout having a resin-based system for anchoring at least one pile, comprising:
   a resin; and
   a boron nitride nanotube structure comprising a boron nitride nanotube having a hexagonal boron nitride structure epitaxial to the boron nitride nanotube; and
   a spacer comprising a hydrocarbon, wherein the grout has a first volume substantially free of the boron nitride nanotube structure and a second volume comprising the boron nitride nanotube structure, and wherein the spacer is between the first volume and the second volume.

* * * * *